(12) United States Patent
Smedley et al.

(10) Patent No.: US 11,418,629 B2
(45) Date of Patent: Aug. 16, 2022

(54) METHODS AND SYSTEMS FOR ACCESSING REMOTE DIGITAL DATA OVER A WIDE AREA NETWORK (WAN)

(71) Applicant: Bay Microsystems, Inc., San Jose, CA (US)

(72) Inventors: Robert Smedley, Highland, MD (US); Soochon Radee, Washington, DC (US); Suresh Shelvapille, Rockville, MD (US); Edward Kinzler, Brunswick, MD (US); Richard Smedley, Clarksville, MD (US); Joseph Senesi, New Market, MD (US); Daniel Eigenbrode, Frederick, MD (US); John Wolf, Adamstown, MD (US); Anunoy Ghosh, Germantown, MD (US); Gerard Jankauskas, Mendon, MA (US); Man Dieu Trinh, San Jose, CA (US)

( * ) Notice: Subject to any disclaimer, the term of this patent is extended or adjusted under 35 U.S.C. 154(b) by 946 days.

(21) Appl. No.: 14/716,699

(22) Filed: May 19, 2015

(65) Prior Publication Data

US 2015/0334034 A1    Nov. 19, 2015

Related U.S. Application Data

(60) Provisional application No. 62/100,819, filed on Jan. 7, 2015, provisional application No. 62/000,492, filed on May 19, 2014.

(51) Int. Cl.
*H04L 69/08* (2022.01)
*H04L 47/10* (2022.01)
(Continued)

(52) U.S. Cl.
CPC .......... *H04L 69/08* (2013.01); *H04L 12/6418* (2013.01); *H04L 47/39* (2013.01);
(Continued)

(58) Field of Classification Search
CPC ......... H04L 69/08; H04L 47/39; H04L 67/10; H04L 12/6418; H04L 49/10; H04L 63/0272
(Continued)

(56) References Cited

U.S. PATENT DOCUMENTS 6,252,878 B1   6/2001 Locklear, Jr. et al.
6,449,251 B1 * 9/2002 Awadallah .............. H04L 29/06
                                                                    370/229
(Continued)

OTHER PUBLICATIONS

International Search Report & Written Opinion, PCT/US2015/031623, dated May 19, 2015.
(Continued)

*Primary Examiner* — Michael Won

(57) ABSTRACT

Systems and methods accessing remote digital data over a wide area network (WAN) are disclosed. In an embodiment, a network device is disclosed. The network device includes a local area network (LAN) switching fabric physical interface configured to communicate according to a LAN switching fabric protocol, a WAN physical interface configured to communicate according to a WAN protocol, and a fabric extension function configured to map LAN switching fabric interfaces to pseudo-ports, map pseudo-ports to WAN interfaces, and transmit LAN fabric datagrams received at the LAN switching fabric physical interface from the WAN physical interface via a mapped pseudo-port and a corresponding WAN interface.

16 Claims, 15 Drawing Sheets

(51) Int. Cl.
*H04L 67/10* (2022.01)
*H04L 12/64* (2006.01)
*H04L 49/10* (2022.01)
*H04L 9/40* (2022.01)

(52) U.S. Cl.
CPC .............. *H04L 49/10* (2013.01); *H04L 67/10* (2013.01); *H04L 63/0272* (2013.01)

(58) Field of Classification Search
USPC ................ 709/220, 227, 242, 246, 249, 250
See application file for complete search history.

(56) References Cited

U.S. PATENT DOCUMENTS

| | | | | |
|---|---|---|---|---|
| 6,574,332 | B1* | 6/2003 | Moore | H04M 3/51 379/265.02 |
| 6,640,206 | B1* | 10/2003 | Callender | H04L 12/413 709/213 |
| 7,633,955 | B1* | 12/2009 | Saraiya | H04L 49/356 370/395.31 |
| 7,782,780 | B1* | 8/2010 | Gibson | H04L 49/254 370/235 |
| 7,860,961 | B1* | 12/2010 | Finkelstein | H04L 12/4641 709/201 |
| 8,149,731 | B2* | 4/2012 | Ervin | H04L 12/4633 370/254 |
| 8,180,891 | B1* | 5/2012 | Harrison | H04L 63/10 709/224 |
| 8,437,359 | B1 | 5/2013 | Burton, III et al. | |
| 8,543,681 | B2* | 9/2013 | Bearden | H04L 41/0213 709/218 |
| 2001/0043564 | A1* | 11/2001 | Bloch | H04L 12/4604 370/230 |
| 2002/0150049 | A1* | 10/2002 | Collier | H04L 47/10 370/236 |
| 2002/0159385 | A1* | 10/2002 | Susnow | H04L 47/39 370/428 |
| 2002/0159389 | A1* | 10/2002 | Foster | H04L 49/357 370/230 |
| 2002/0165978 | A1 | 11/2002 | Chui | |
| 2004/0013088 | A1* | 1/2004 | Gregg | H04L 12/5602 370/252 |
| 2004/0078541 | A1 | 4/2004 | Lightstone et al. | |
| 2004/0090970 | A1* | 5/2004 | Sanchez | H04L 12/18 370/397 |
| 2004/0223454 | A1* | 11/2004 | Schober | H04L 49/358 370/229 |
| 2005/0138243 | A1 | 6/2005 | Tierney et al. | |
| 2007/0067751 | A1 | 3/2007 | Seno | |
| 2007/0094403 | A1* | 4/2007 | Colven | H04L 67/322 709/230 |
| 2007/0233894 | A1 | 10/2007 | Ling et al. | |
| 2007/0256059 | A1* | 11/2007 | Sullivan | G06F 9/45504 717/139 |
| 2010/0254387 | A1 | 10/2010 | Trinh et al. | |
| 2010/0303078 | A1* | 12/2010 | Karir | H04L 29/12028 370/392 |
| 2011/0280159 | A1* | 11/2011 | Miller | H04L 12/4625 370/256 |
| 2012/0311065 | A1 | 12/2012 | Ananthanarayanan et al. | |
| 2013/0107872 | A1* | 5/2013 | Lovett | H04L 49/10 370/352 |
| 2013/0148768 | A1 | 6/2013 | Kim | |
| 2013/0201986 | A1* | 8/2013 | Sajassi | H04L 45/48 370/390 |
| 2013/0322252 | A1 | 12/2013 | DeCusatis et al. | |
| 2014/0016501 | A1 | 1/2014 | Kamath et al. | |
| 2014/0023074 | A1 | 1/2014 | Mishra et al. | |
| 2014/0086041 | A1 | 3/2014 | Shah et al. | |
| 2014/0112203 | A1 | 4/2014 | Rao et al. | |
| 2014/0115088 | A1 | 4/2014 | DeCusatis et al. | |
| 2014/0269271 | A1 | 9/2014 | Gafni et al. | |
| 2015/0334034 | A1* | 11/2015 | Smedley | H04L 49/10 709/219 |
| 2017/0005813 | A1* | 1/2017 | Sobh | G06F 9/452 |

OTHER PUBLICATIONS

Cisco, "Layer 2 Everywhere: Overcoming Overlay Transport Virtualization (OTV) Site Limitations Within and Between Data Centers"; Design Document; pp. 1-46; Mar. 29, 2012.
Pfister, Gregory F.; "An Introduction to the InifniBand Architecture"; pp. 617-632; Feb. 4, 2002.
Brocade, "Industry-Leading SAN Extension for Remote Data Replication, Backup, and Migration"; Brocade 7800 Extension Switch; 8 pgs.; 2013.
Cisco, "Cisco FabricPath"; 2 pgs.; 2010.
Cisco, "Data Center Interconnect: Layer 2 Extension Between Remote Data Centers"; White Paper; 30 pages; 2011.
HP, "Converged networks with Fibre Channel over Ethernet and Data Center Bridging"; Technology brief, 3rd Edition; 9 pgs.; Oct. 2011.
Fujitsu, "Brocade 7800 Extension Switch Data Center"; Datasheet; www.fujitsu.com/eternus/; pp. 1-7; Jun. 16, 2010.
Brocade, "Industry-Leading SAN Extension for Remote Data Replication, Backup, and Migration"; FX8-24 Extension Blade; 8 pgs.; 2013.

* cited by examiner

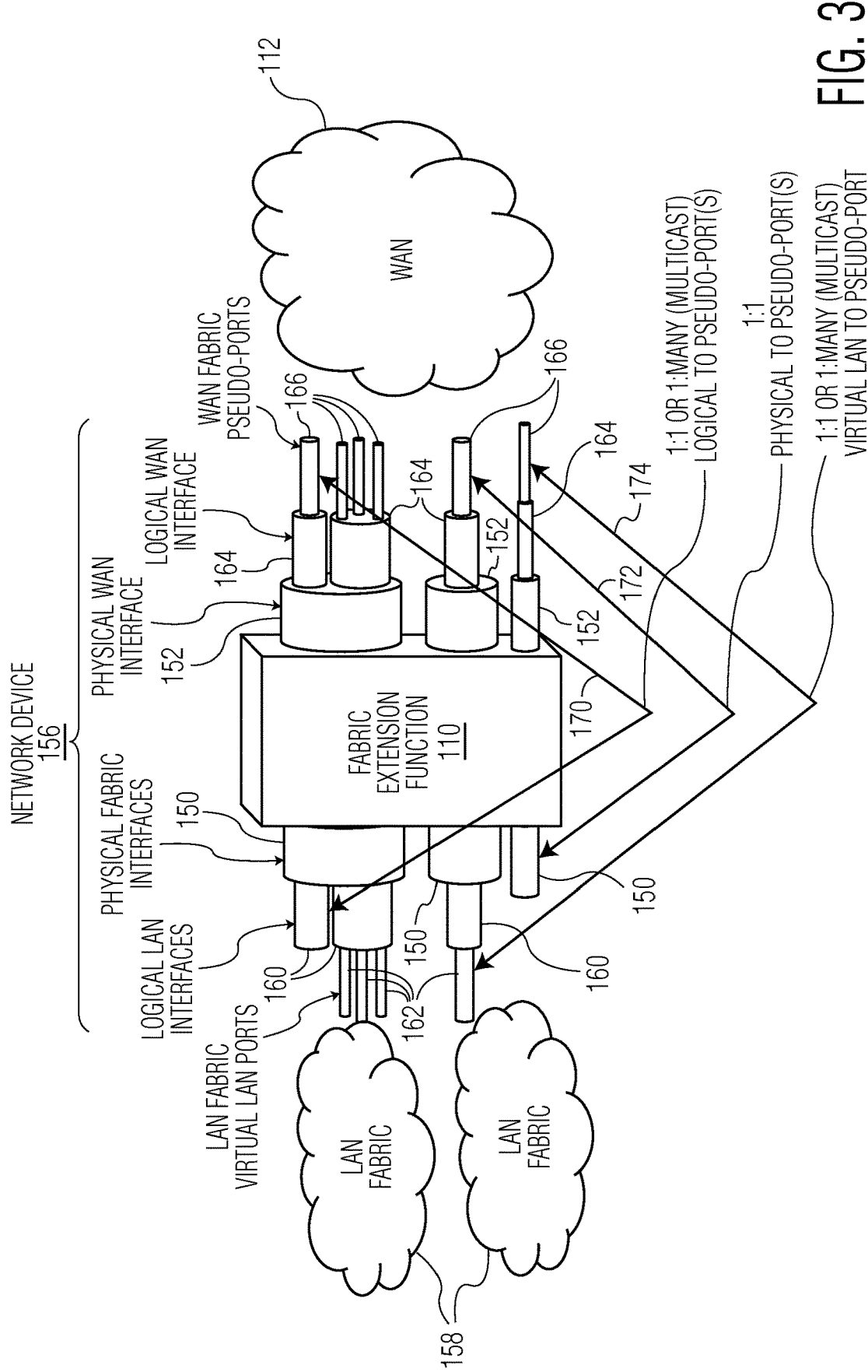

FIG. 4A

PSEUDO-LINK PACKET (178)

| | 31 | | | | | | | | | 0 |
|---|---|---|---|---|---|---|---|---|---|---|
| WORD 0 | VL | LV | SL | T | LNH | | | DLID | | |
| WORD 1 | RSVD | | PLEN | | | | | SLID | | |
| WORD 2 | RSVD | | | | | | | | | |
| WORD 3 | RSVD | | | | LSOPCODE | | | LINKSTATE | | |
| WORD 4 | RSVD | | | | | | | | | |
| WORD 5 | RSVD | | | | | | | | | |
| WORD 6 | RSVD | | | | | | | | | |
| WORD 7 | RSVD | | | | | | | | | |
| WORD 8 | RSVD | | | | | | | | | |
| WORD 9 | RSVD | | | | | | | | | |
| WORD 10 | RSVD | | | | | | | | | |
| WORD 11 | RSVD | | | | | | | | | |
| WORD 12 | RSVD | | | | | | | | | |
| WORD 13 | RSVD | | | | | | | | | |
| WORD 14 | RSVD | | | | | | | | | |
| WORD 15 | RSVD | | | | | | | | | |

VL[3:0] = VIRTUAL LANE (4'hF)
LV[3:0] = LINK VERSION (4'h0)
SL[3:0] = SERVICE LEVEL (4'h0)
T[1:0] = TYPE (2'h1)
LNH[1:0] = LINK NEXT HEADER (2'h0)
DLID[15:0] = DESTINATION LOCAL ID (16'h0)
PLEN[10:0] = PACKET LENGTH (11'h20)
SLID[15:0] = SOURCE LOCAL ID (16'hCAFE)
LSOPCODE[7:0] = LINK STATE OPCODE (00=DEBOUNCE; 01=linkInitReq; 10=linkInitAck OR linkInitialized)
LINKSTATE[7:0] = LINK STATE (00=Down; 01=INIT; 10=ARM; 11=ACTIVE)
RSVD = RESERVED (SET TO 0)

PSEUDO-FLOW CONTROL PACKET (180)

| | 31 | | | | | | | | | 0 |
|---|---|---|---|---|---|---|---|---|---|---|
| | VL | LV | SL | T | LNH | | | DLID | | |
| | RSVD | | PLEN | | | | | SLID | | |
| | | | | | FCTBS | | | | | |
| | | | | | FCCL | | | | | |
| | RSVD | | | | | | | | | |
| | RSVD | | | | | | | | | |
| | RSVD | | | | | | | | | |
| | RSVD | | | | | | | | | |
| | RSVD | | | | | | | | | |
| | RSVD | | | | | | | | | |
| | RSVD | | | | | | | | | |
| | RSVD | | | | | | | | | |
| | RSVD | | | | | | | | | |
| | RSVD | | | | | | | | | |
| | RSVD | | | | | | | | | |
| | RSVD | | | | | | | | | |

VL[3:0] = VIRTUAL LANE (SET TO THE QUEUE NUMBER)
LV[3:0] = LINK VERSION (4'h0)
SL[3:0] = SERVICE LEVEL (4'h0)
T[1:0] = TYPE (2'h2)
LNH[1:0] = LINK NEXT HEADER (2'h0)
DLID[15:0] = DESTINATION LOCAL ID (16'h0)
PLEN[10:0] = PACKET LENGTH (11'h20)
SLID[15:0] = SOURCE LOCAL ID (16'hBEEF)
FCTBS[31:0] = FLOW CONTROL TRANSMIT BLOCKS SENT
FCCL[31:0] = FLOW CONTROL CREDIT LIMIT
RSVD = RESERVED (SET TO 0)

| 31 | | | | PSEUDO-PORT PACKET | 183 | | 0 |
|---|---|---|---|---|---|---|---|
| WORD 0 | RSVD | TID | | | PLEN | | |
| WORD 1 | | | | CC | | | |
| WORD 2 | RSVD | | LOP | | RSVD | | PS |
| WORD 3 | RSVD | | | | | | FCTBS[39:32] |
| WORD 4 | FCTBS[31:0] | | | | | | |
| WORD 5 | RSVD | | | | | | FCCL[39:32] |
| WORD 6 | FCCL[31:0] | | | | | | |
| WORD 7 | RSVD | | | | | | |
| WORD 8 | RSVD | | | | | | |
| WORD 9 | RSVD | | | | | | |
| WORD 10 | RSVD | | | | | | |
| WORD 11 | RSVD | | | | | | |
| WORD 12 | RSVD | | | | | | |
| WORD 13 | RSVD | | | | | | |

TID[7:0] = TUNNELID
PLEN[15:0] = PACKET LENGTH (HARDCODED TO 0x40)
CC[31:0] = CHECK CODE (HARDCODED TO 0xcafebeef)
LOP[3:0] = LINK OPCODE
PS[1:0] = PSEUDO-PORT STATE (00=Down; 01=INIT; 10=ARM; 11=ACTIVE)
FCTBS[39:0] = FLOW CONTROL TRANSMIT BLOCKS SENT
FCCL[39:0] = FLOW CONTROL CREDIT LIMIT

FIG. 4C

| OPTION | METHOD | FEATURES | OSI LAYER | EVALUATION | RESULT | EFFICIENCY GAINS | LATENCY |
|---|---|---|---|---|---|---|---|
| WAN FABRIC | LOSSLESS FABRIC EXTENSION; RDMA UTILIZATION; ADVANCED CREDIT BUFFERING OVER WAN | ELIMINATES TCP/IP LIMITATIONS; EXTENDS STANDARD DATA CENTER FABRIC TO WAN; TRAFFIC ENGINEERING TRAFFIC MANAGEMENT | LAYER 2 | COMPATIBLE WITH AND COMPLEMENTARY TO EXISTING DATA INFRASTRUCTURE AND OPTIMIZATION TECHNOLOGIES; DETERMINISTIC PERFORMANCE. | INCREASED BANDWIDTH UTILIZATION TO ~95% (3x-9x DISTANCE/CIRCUIT DEPENDENT); NATIVE LAYER 2 INTERCONNECT; GLOBAL REACH (20,000km); RDMA DATA THROUGHPUT >40x. COMPUTE REDUCTION (USING RDMA FILE TRANSFER) BY ~94% w/ PARALLEL FILE SYSTEMS. | REAL-WORLD TESTING BY NRL SHOWED 94% NETWORK EFFICIENCY COMPARED TO 6% ALTERNATIVE AT 13,000km WITH MULTIPLE FILES AND MULTIPLE STREAMS. | INITIAL LATENCY OF DISTANCE AND FIBER LINE OVERHEADS RELATED TO REPEATERS/AMPS ONLY. NEAR SPEED OF LIGHT (~5μs per/km) TRANSFERS. |
| WAN OPTIMIZATION CONTROLLERS | LATENCY MINIMIZATION | PROTOCOL AND APPLICATION-SPECIFIC OPTIMIZATION | LAYERS 3-7 | DOES NOT ADDRESS TCP/IP LIMITATIONS; PERFORMANCE DEPENDS ON APPLICATION AND TRAFFIC PATTERN; OFTEN CONFLICTS WITH OTHER OPTIMIZATION TECHNIQUES. | PROMINENT VENDOR CLAIMS 2.2x FASTER DATA TRANSFER AND 50% DATA REDUCTION (1st DOWNLOAD) OF OFFICE365 SINGLE FILE. REQUIRES LEARNING ABOUT THE DATA TO ACHIEVE OPTIMUM RESULTS. | VARIES BY APPLICATION AND DATA TYPE/SIZE/FREQUENCY. RIVERBED CLAIMS HIGHEST EFFECT NOTED PREVIOUSLY. | LITTLE IMPACT – PRIMARILY DEALS WITH "CHATTY" PROTOCOLS AND LARGE HEADER MESSAGES TO REDUCE OVERHEAD AND SEND/ACK STYLE REQUESTS. |
| | BANDWIDTH REDUCTION | COMPRESSION DEDUPLICATION, CACHING | | | | | |
| | NETWORK-BASED OPTIMIZATION | TRAFFIC PRIORITIZATION/SHAPING, QoS POLICING | | | | | |
| APPLICATION DELIVERY CONTROLLERS | ADVANCED LOAD BALANCING | ASYMMETRIC LOAD, PRIORITY ACTIVATION, SSL OFFLOAD AND ACCELERATION, TCP OFFLOAD/BUFFERING | LAYERS 4-7 | DOES NOT ADDRESS TCP/IP LIMITATIONS; LESS EMPHASIS ON OPTIMIZATION, MORE ON OFFLOADING PROCESSING. | APPLICATION-SPECIFIC BENEFITS REDUCING AMOUNT OF DATA TRANSFERRED OR PROCESSED BY ~50% (COMPUTE/DATA REDUCE). | VARIES BY APPLICATION AND DATA TYPE/STRUCTURE/SIZE/FREQUENCY. AS HIGH AS 50% REDUCTION PER ENP PUBLICATION. | LIMITED IMPACT FROM OFFLOAD AND BUFFERING. |
| OVERALL CAPACITY ADDITION | BANDWIDTH EXPANSION; INVERSE MUXING AND LINK AGGREGATION | ADDITIONAL CIRCUITS OR SCALABLE BANDWIDTH ALLOCATION ON SHARED CIRCUITS | LAYERS 1-2 | DOES NOT ADDRESS TCP/IP LIMITATIONS; COSTLY; LIMITED SCALABILITY. | ADDITIONAL PIPE OR INCREASED BANDWIDTH ALLOCATION ON FAT-PIPES. | NO IMPACT | NO IMPACT |

FIG. 10

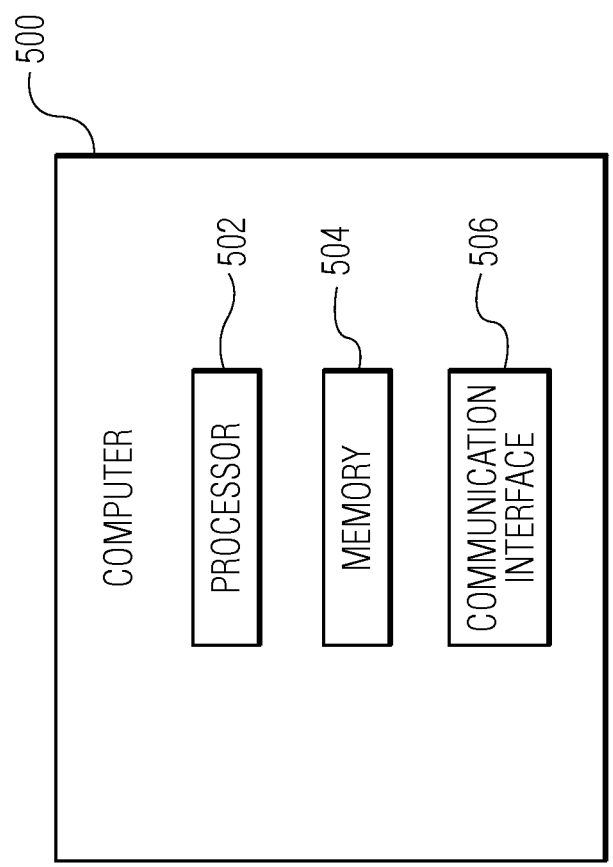

METHODS AND SYSTEMS FOR ACCESSING REMOTE DIGITAL DATA OVER A WIDE AREA NETWORK (WAN)

CROSS-REFERENCE TO RELATED APPLICATIONS

This application is entitled to the benefit of provisional U.S. Patent Application Ser. No. 62/000,492, filed May 19, 2014 and provisional U.S. Patent Application Ser. No. 62/100,819, filed Jan. 7, 2015, the disclosure of which is incorporated by reference herein in its entirety.

FIELD OF THE INVENTION

The invention relates generally to data networks, and more particularly to systems and methods for accessing remote digital data over a wide area network (WAN).

BACKGROUND OF THE INVENTION

High performance switching fabrics, first used within high-performance computing centers, are now being used to efficiently network large-scale storage and computing resources. A switching fabric typically includes a mesh of multi-level no-loss switches that connect to network interfaces contained within the computing and storage elements. The network interfaces commonly use proactive and reactive flow control, as well as end-to-end coordination of send and receive buffer conditions, for a given transmission of datagrams to prevent network congestion and loss.

More often, hardware acceleration, such as a form of remote direct memory access (RDMA), is used to queue datagrams for transmission and receive datagram placement directly within the volatile Random Access Memory (RAM) without processor and software intervention until the transfer is complete. The overall network performance allows a high percentage of bandwidth of a given physical and logical connection to be used in a sustained manner while maintaining a very low, sub-microsecond latency between send and receive elements. Use of such low-loss or lossless switching fabrics has heretofore been limited to use within local area networks (LANs) with generally less than 1 km in cable or fiber distance between the furthest elements on a given fabric. Similar to the TCP/IP distance degradation, the limitation is typically a function of outstanding buffer elements to sustain the network connection and remain fully utilized.

Low-loss and lossless low-latency network technologies currently include INFINIBAND, Fibre channel, and variants of Ethernet, including IEEE 802.3x pause frames, Data Center Bridging (DCB), IEEE 802.1Qbb (Priority-based Flow Control), IEEE 802.1 Qaz (Enhanced Transmission Selection), IEEE 802.1Qau (Congestion Notification), OpenFabrics RDMA over Converged Ethernet (RoCE), and Omni-Path. All of these low-loss and lossless low-latency network technologies generally have network data rates at and above 10 Gbps and more commonly at 40 and 100 Gbps with roadmap plans that extend well beyond 100 Gbps. These high-performance LAN fabrics are the backbone of massive, as well as distributed, data centers.

SUMMARY OF THE INVENTION

Systems and methods accessing remote digital data over a WAN are disclosed. In an embodiment, a network device is disclosed. The network device includes a LAN switching fabric physical interface configured to communicate according to a LAN switching fabric protocol, a WAN physical interface configured to communicate according to a WAN protocol, and a fabric extension function configured to map LAN switching fabric interfaces to pseudo-ports, map pseudo-ports to WAN interfaces, and transmit LAN fabric datagrams received at the LAN switching fabric physical interface from the WAN physical interface via a mapped pseudo-port and a corresponding WAN interface.

In an embodiment, the fabric extension function is further configured to transmit and receive pseudo-port link packets via the WAN physical interface to establish a link across the WAN. In an embodiment, the fabric extension function is further configured to transmit and receive pseudo-port packets via the WAN physical interface to implement flow control across the WAN. In an embodiment, the fabric extension function is further configured to transmit and receive pseudo-port packets via the WAN physical interface to implement credit-based flow control across the WAN. In an embodiment, the fabric extension function is further configured to transmit and receive pseudo-port packets via the WAN physical interface to establish a link across the WAN, wherein the fabric extension function is further configured to transmit and receive pseudo-port packets via the WAN physical interface to implement credit-based flow control across the WAN, and wherein the fabric extension function is further configured to transmit and receive LAN fabric datagrams over the established link via the WAN physical interface according the credit-based flow control. In an embodiment, the fabric extension function is further configured to transmit and receive pseudo-port packets via the WAN physical interface to establish a link across the WAN, wherein the fabric extension function is further configured to transmit and receive pseudo-port packets via the WAN physical interface to implement XON/XOFF flow control across the WAN, and wherein the fabric extension function is further configured to transmit and receive LAN fabric datagrams over the established link via the WAN physical interface according the XON/XOFF flow control. In an embodiment, the fabric extension function is further configured to measure delay through the WAN and to use the measured delay to adjust buffer depths to maintain buffer extension and lossless characteristics of the pseudo-ports. In an embodiment, the LAN switching fabric physical interface is configured to communicate according to one of INFINIBAND, Fibre channel, IEEE 802.3x pause fames, Data Center Bridging (DCB), IEEE 802.1Qbb (Priority-based Flow Control), IEEE 802.1 Qaz (Enhanced Transmission Selection), IEEE 802.1Qau (Congestion Notification), OpenFabrics RDMA over Converged Ethernet (RoCE), and Omni-Path and wherein the WAN physical interface is configured to interface with SONET, SDH, OTN, dark fiber, Ethernet, or satellite. In an embodiment, a pseudo-port is associated with a logical WAN connection that allows a port of the LAN switching fabric to be extended across WAN.

A method for accessing remote digital data over a WAN is disclosed. The method involves receiving LAN fabric datagrams at a LAN switching fabric physical interface of a first network device, mapping the LAN switching fabric interface of the received LAN fabric datagrams to a pseudo-port, and transmitting the LAN fabric datagrams from a WAN physical interface of the first network device using the mapped pseudo-port.

In an embodiment, the involves receiving the LAN fabric datagrams at a WAN physical interface of a second network device, mapping the pseudo-port of the received LAN fabric datagrams to a LAN switching fabric interface of the second network device, and transmitting the LAN fabric datagrams from a LAN switching fabric physical interface of the second network device via the mapped LAN switching fabric interface. In an embodiment, the LAN fabric datagrams are transmitted from the WAN physical interface of the first network device using credit-based flow control. In an embodiment, the LAN fabric datagrams are transmitted from the WAN physical interface of the first network device using a logical WAN interface carried within the WAN physical interface.

In another embodiment, a method for accessing remote digital data over a WAN is disclosed. The method involves, at a first network device that includes a local area network (LAN) switching fabric physical interface configured to communicate according to a LAN switching fabric protocol and a WAN physical interface configured to communicate according to a WAN protocol, exchanging pseudo-port packets with a WAN physical interface of a second network device to couple the LAN switching fabric across the WAN, the pseudo-port packets includes a field for carrying a pseudo-port identifier, a link state operations code field for carrying information to establish a link between the first network device and the second network device across the WAN, and a link state field for carrying information about a link state. The method also involves exchanging pseudo-port packets with the WAN physical interface of the second network device via the WAN physical interface of the first network device to implement flow control of LAN fabric datagrams that are transmitted across the WAN.

In an embodiment, the pseudo-port packets comprise a Flow Control Transmit Blocks Sent (FCTBS) field. In an embodiment, the FCTBS field of the pseudo-port packets carries a running count of blocks sent. In an embodiment, the pseudo-port packets comprise a Flow Control Credit Limit (FCCL) field. In an embodiment, the FCCL field of the pseudo-port packets carries rolling count of credits. In an embodiment, the pseudo-port packets comprise a FCTBS field, wherein the FCTBS field of the pseudo-port packets carries a running count of blocks sent, and the pseudo-port packets comprise a FCCL field, wherein the FCCL field of the pseudo-port packets carries rolling count of credits. In an embodiment, the LAN switching fabric physical interface is configured to communicate according to one of INFINI-BAND, Fibre channel, IEEE 802.3x pause fames, Data Center Bridging (DCB), IEEE 802.1Qbb (Priority-based Flow Control), IEEE 802.1 Qaz (Enhanced Transmission Selection), IEEE 802.1Qau (Congestion Notification), OpenFabrics RDMA over Converged Ethernet (RoCE), and Omni-Path and wherein the WAN physical interface is configured to interface with SONET, SDH, OTN, dark fiber, Ethernet, or satellite.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 3 illustrates the mapping of LAN switching fabric interfaces to WAN fabric pseudo-ports at a fabric extension function.

FIG. 4A illustrates examples of a pseudo-link packet and a pseudo-flow control packet, which are used between WAN extension functions across a WAN.

FIG. 4C illustrates an example of a pseudo-port packet, which is used between WAN extension functions across a WAN.

FIG. 10 is a table that compares aspects of the disclosed WAN fabric extension technique with conventional techniques of WAN optimization controllers, application delivery controllers, and overall capacity addition.

FIG. 13 depicts a computer.

Throughout the description, similar reference numbers may be used to identify similar elements.

DETAILED DESCRIPTION

Figure 1:
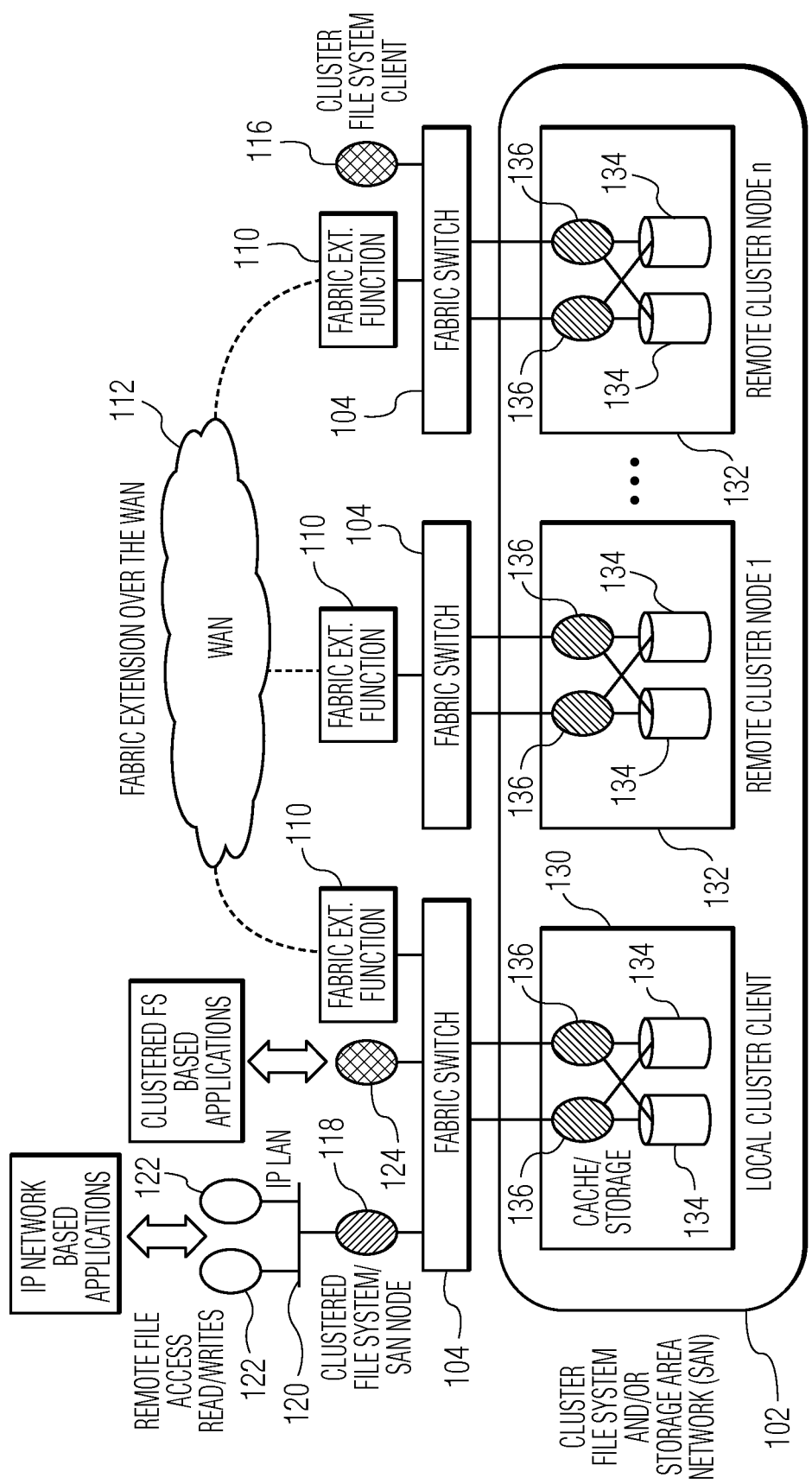
FIG. 1 illustrates an example of a deployment of distributed storage and computing resources networked over an extended WAN fabric.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Methods and systems for managing the effects of common network connectivity that introduce varying and reduced performance when used over large geographic distance to access digital data to provide communications between a plurality of digital computing and/or communication devices are disclosed.

The fabric establishes any number of end-to-end credit buffered layer 2 dynamic pseudo-ports, assigned to logical WAN tunnels that interact with the switch fabric LANs to provide lossless layer 2 WAN fabric.

Applicable networking technology includes: TCP/IP networking over wide-area networks; Low-loss networking in a LAN environment (Ethernet, RDMA over Converged Ethernet (RoCE), Datacenter Bridging, INFINIBAND, Fibre Channel, Omni-Path); Distributed file systems, Object storage systems; Remote clustered file systems, Cached remote file systems; Wide area networks, Optical Networks; Remote direct memory access (RDMA); and Satellite digital data link.

Methods and systems for accessing, communicating and sharing digital data that reside beyond a local environment that is remotely accessible over a wide-area network (WAN) connection by extending multiple and concurrent high performance Layer 2 LAN low-loss switch fabrics between two or more node remote systems, where a node is often a local area network (LAN), are disclosed. The disclosed techniques create a plurality of end-to-end credit buffered Layer 2 dynamic pseudo-ports, assigned to logical WAN tunnels that interact with the switch fabric LANs to establish a lossless Layer 2 WAN fabric. This WAN fabric is able to efficiently utilize the aggregate bandwidth provided over the WAN connections, often sustaining greater than 90% utilization of the assigned bandwidth.

Combining low latency packet processing, traffic management, and switching within a fabric extension function and high utilization of the WAN bandwidth provides for a very low latency and lossless WAN fabric by minimizing the time between sending of the first octet and receipt of the last octet of a transmission or transaction.

One implementation, or use, provides for connecting two or more high-speed, low-loss LAN fabrics over the WAN for peer-to-peer and remote storage applications while maintaining network performance. A second implementation provides a capability to locate a remote multi-cluster file system mount-point directly connected to the LAN to allow direct non-cached access to the global file data over a WAN connection. A third implementation provides a multi-node, multi-cluster file system to connect cluster nodes over a high-performance low-latency connection to form a global multi-cluster file system.

In another case of WAN connectivity, the capabilities enabled by the described methods and systems apply to high latency, time varying performance satellite links to provide comparative link bandwidth efficiencies found with traditional terrestrial WAN connectivity. The satellite communications link application is also shown to not bound or hard-limit link bandwidth as compared with other data link methods that are commonly used.

This disclosure also relates to data networking over a WAN. In particular, the extension of distance limited high-speed and highly efficient datacenter and computing center switching fabric interconnection over long distance network connections between two or more locations. These connections establish a high-performance, low-loss protocol and physical interface agnostic layer 2 WAN switching fabric that is able to interface and operate directly with multiple LAN and datacenter fabrics.

High performance switching fabrics, first used within high-performance computing centers, are now being used to efficiently network large-scale storage and computing resources. A switching fabric comprises multi-level no-loss switches that connect to network interfaces contained within the computing and storage elements. The network interfaces commonly use methods of pro-active and reactive flow control as well as end-to-end coordination of send and receive buffer conditions for a given transmission of datagrams to prevent network congestion and loss. More often, hardware acceleration, such as a form of RDMA, is used to queue datagrams for transmission and receive datagram placement directly within the volatile RAM without processor and software intervention until the transfer is complete. The overall network performance allows a high percentage of bandwidth of a given physical and logical connection to be used in a sustained manner while maintaining a very low, sub-microsecond, latency between send and receive elements.

Such switching fabrics differ from common IEEE 802.3 Ethernet where congestion and loss is anticipated and a transmission protocol, such as TCP, is used to recover lost data, reduce the transmission of data when loss is detected, and to reorder datagrams in the event the network caused reordering. TCP/IP is a ubiquitous transmission protocol used for most Internet applications except for real-time applications such as IP telephony and media distribution where some loss is tolerated to reduce latency. For TCP/IP, loss commonly occurs with network congestion, where sending datagram sources exceed the available network capacity for a given connection, and long delay, where the required datagram receipt acknowledges take longer than there is available queue memory.

Use of low-loss or lossless switching fabrics are generally constrained for use within a LAN, generally less than 1 Km in cable or fiber distance between the furthest elements on a given fabric. Similar to the TCP/IP distance degradation, the limitation is a function of outstanding buffer elements to sustain the network connection to remain fully utilized.

Low-loss and lossless low-latency network technologies currently include, for example, INFINIBAND, Fibre channel, and variants of Ethernet including datacenter bridging (DCB), IEEE 802.3Qbb, IEEE 802.1Qaz (Enhanced Transmission Selection), IEEE 802.1Qau (Congestion Notification), Open Fabrics RDMA over converged Ethernet (RoCE), INTEL Omni-Path, IEEE 802.1Qbb (Priority-based flow control), IEEE 802.3x pause frames, . All of these generally have network data rates at and above 10 Gbps and more commonly at 40 and 100 Gbps with roadmap plans well beyond 100 Gbps.

WAN service type may include, for example, a point-to-point Optical (synchronous optical networking (SONET), synchronous digital hierarchy (SDH), or optical transport network (OTN)) datagram service, and point-to-point and point-to-multi-point full rate or partial-rate Ethernet service, layer 2 VPN (virtual private network) service, multiprotocol label switching traffic engineering (MPLS-TE) service, or dark fiber connection. Use of the WAN service often includes connectivity to a logical WAN connection where the logical WAN connection has attributes such as source and destination addresses used for routing traffic in a manner compatible with the logical tunnel type, and some amount of bandwidth assigned with a priority of transmission.

A special case of WAN service included within the application space for the described technique is a point-to-point and point-to-multipoint satellite link where a link service interface includes an Ethernet service point using layer 2 mapping within the satellite modem.

The techniques disclosed herein, referred to as, for example, fabric extension, fabric extension function, fabric extension device, provides methods and systems to minimize the datagram loss, congestion and degradation of networks operating over geographically distant networks, or WAN, to extend and network high-performance switch fabrics. This function is established by maintaining the switch fabrics lossless and maintaining the high percentage bandwidth utilization attributes while minimizing the effects of delay (latency) introduced by the WAN. Fabric extension allows for a multi-location scale-out architecture that significantly extends the current limitations of the fabric constraints of distance beyond a single room or location to thousands of kilometers.

In an embodiment, the technique of fabric extension involves establishing the capability and performance of extending a LAN that has been designed to perform in a manner that significantly reduces the possibility of datagram loss to a plurality of LANs that connect across a set of logical WAN connections. LAN fabric datagrams and pseudo-port link and flow control datagrams are transmitted across these WAN logical connections. The WAN fabric is established at a WAN fabric extension function, commonly implemented as a separate network equipment device or functional operation within larger network equipment.

Each WAN fabric extension function will network and communicate with all other fabric extension functions over the physical or logical WAN connections that are discovered, registered and configured as pseudo-ports. In an embodiment, a pseudo-port refers to a logical WAN connection that allows the emulation of a layer 2 fabric port to be extended across the low-loss WAN fabric.

In an embodiment, fabric extension involves combining one or more local area switch fabrics, each with individual physical interfaces. Over each physical local interface, the fabric extension function will uniquely and distinctly interact with the individual fabric protocol for all operations. Fabric interface operations may include initialization, identification, detection, active management, datagram routing, filtering, multicasting, and forwarding, fault detection and recovery, statistics gathering and reporting, rate limiting, flow control participation, and interface enabling and disabling.

Further, the fabric extension function is capable of interfacing with a WAN service in order to facilitate connectivity with the networked LAN fabrics. The WAN service type may include a point-to-point Optical (SONET, SDH, or OTN) datagram service, and point-to-point and point-to-multi-point full rate or partial-rate Ethernet service, a layer 2 VPN (virtual private network) service, an MPLS-TE service, or dark fiber connections.

Further, the fabric extension function is capable of interfacing with a digital data satellite modulator/demodulator (modem) over an Ethernet service interface acting as a WAN communications path. The Ethernet service interface will provide a single or plurality of full duplex physical IEEE 802.3 Ethernet interfaces with 10, 100, 1,000 Mbit BaseT or 1, 10G Ethernet with pause frame flow control. The modem data link rate, or channel rate, will vary based on modulation code, modulation method, number of radio frequency streams, forward error correction, framing protocol, symbol rate, transponder power, transponder positioning, and environmental effects and other configuration and time varying effects. The fabric extension function is able to respond with configured data traffic rate shaping and interactive flow control from the Ethernet pause-frames.

The WAN, which may include a satellite link, interface operations may include initialization, identification, detection, active management, datagram routing, filtering, multicasting, and forwarding, fault detection and recovery, statistics gathering and reporting, alarm reporting, rate limiting, flow control participation, and enabling and disabling.

A logical WAN connection allows for a source address and one or more destination addresses generally prepending each datagram to be decoded by a switching device within the WAN. This logical WAN connection may be stateless or stateful. A source is able to send to multiple destination devices connected to the network, which is determined by a classification operation followed by a forwarding operation.

Further, in an embodiment, the fabric extension function extends and participates in hop-by-hop and end-to-end proactive and reactive flow control (e.g., credit-based flow control and/or XON/XOFF flow control) and fabric messaging to operate with its full performance and capability over a plurality of network links established over the WAN.

Each fabric extension function has a datagram classification function assigned to each physical fabric port to decode each datagram to determine logical and virtual LAN association to an input datagram buffer and an output datagram buffer. Each physical buffer may be configured to be a logically partitioned buffered queue so as to individually service individual LAN fabric interfaces or LAN fabric logical connections (source-destination address pairs, service levels, logical or virtual LANs). In an embodiment, each input or receive buffer must be sized to hold in memory twice the amount of data, in terms of 8-bit octets or bytes, to match the maximum data able to be transmitted in-flight on the WAN traversing the longest distance representing a propagation delay. In an embodiment, an input or receive buffer is sized as follows:

$$\text{RxbuffSize (bytes)} = 2 \times \text{TxRate}_{max}(\text{bps}) \times \text{TxPropTime}_{max}(\text{sec})/8$$

where RxbuffSize is the buffer size, $\text{TxRate}_{max}$ is the maximum transmission rate across the WAN, and $\text{TxPropTime}_{max}$ is the maximum propagation time across the WAN. The propagation time through the WAN is commonly measured. For certain fixed network types, such as optical WAN connections, a propagation time may be estimated with good approximation if the fiber distance is known.

The fabric extension function has the capability to measure, prior to and during operation, fixed and variable delay through the WAN network for reporting, and to use the information to adjust quasi-dynamic buffer depths to maintain the buffer extension and lossless characteristics of the pseudo-ports.

Across the WAN connections, each receive and transmit controller actively communicates pseudo-port and flow control state with the matched queue controller, with the understanding that the state information is delayed by the one-way propagation time.

The port and flow control information may include virtual connection (e.g., VL or VLAN) information, logical connection information, service level information, source and destination indicators, transmit blocks sent, credit limits, and operation codes for far-end actions to be taken.

The fabric extension function has a capability to assess and monitor WAN link error conditions that affect the proper lossless characteristics of the pseudo-ports. The fabric extension function interprets WAN link errors in order to determine a course of action within the LAN fabric, WAN service, or anticipated issues. If the error condition affects the fabric, the fabric extension function will facilitate fabric error condition operations depending on the type of fabrics affected. The fabric extension function has the capability to perform various types of protection switching and error tree processing to properly recover from network and facility faults.

In an embodiment, the fabric extension function has the capability and may enable packet forward error correction if intermittent errors on a WAN link are anticipated.

In an embodiment, the fabric extension function has the capability and may enable fabric interworking in the condition that fabrics of different interface and protocol types may be connected across the agnostic WAN fabric pseudo-ports.

In an embodiment, the fabric extension function has the capability to insert a programmable delay between each buffer pair. This capability facilitates application and file or object data system development and testing that may have sensitivity to delays incurred across a WAN. This programmable delay is capable of emulating long delays exhibited by long distance WAN connections.

In an embodiment, the fabric extension function allows for direct networking or the establishment of a plurality of logical connections over the WAN creating a WAN fabric to interconnect LAN fabrics. Example applications of fabric extension include: peer-to-peer WAN based networks; multi-site LAN fabric interconnect/extension; WAN connected file system clusters; remote access to data storage over the WAN; remote digital data access over satellite link; satellite link connected file system clusters; aggregation of a plurality of LAN and local fabrics for WAN and Satellite link connection; and peer-to-peer satellite connected networks.

FIG. 1 illustrates an example of a deployment of distributed storage and computing resources networked over an extended WAN fabric. In an embodiment, all resources may be accessed with performance directly proportional to the allocated WAN bandwidth established between each site. The fabric extension is a layer 2 fabric that maintains (e.g., without any loss) source to destination flow and buffer control. Example implementations include connecting two or more high-speed, low-loss LAN fabrics over the WAN for peer-to-peer and remote storage applications while maintaining network performance; a capability to locate a remote multi-cluster file system mount-point directly connected to the LAN to allow direct non-cached access to the global file data over a WAN connection; and a multi-node, multi-cluster file system to connect cluster nodes over a high-performance low-latency connection to form a global multi-cluster file system.

As stated above, FIG. 1 illustrates an example of a deployment of distributed storage and computing resources networked over an extended WAN fabric. As illustrated in FIG. 1, the system includes a cluster file system and/or a storage area network (SAN) 102, fabric switches 104, fabric extension functions 110, and a WAN 112. The system also includes ancillary elements such as a node 116 that supports cluster file system clients, a clustered file system/SAN controller node 118, an IP LAN 120, nodes that support IP network based applications 122, and a node 124 that supports clustered file system based applications. In the embodiment of FIG. 1, the cluster file system and/or SAN includes a local cluster client 130, and remote cluster nodes 132 (nodes 1 through n). The local cluster client and the remote cluster nodes include shared storage disks 134 and storage controllers 136. Shared storage disks and storage controllers are known in the field of cluster file systems and SANs.

A fabric switch 104 is associated with the local cluster client 130 and each remote cluster node 132. In an embodiment, the fabric switches manage traffic within the corresponding cluster and manage the ingress of traffic to the cluster and the egress of traffic from the cluster. In an embodiment, a LAN fabric may include multiple multi-level no-loss fabric switches that connect to network interfaces contained within the storage controllers and/or the shared storage disks. The network interfaces commonly use proactive and reactive flow control as well as end-to-end coordination of send and receive buffer conditions for a given transmission of datagrams to prevent network congestion and loss. Low-loss and lossless low-latency network technologies currently include INFINIBAND, Fibre channel, and datacenter variants of Ethernet including datacenter bridging (DCB), IEEE 802.3Qbb, IEEE 802.1Qaz, IEEE 802.1Qau, and Open Fabrics RDMA over converged Ethernet (RoCE). These network technologies generally have network data rates at and above 10 Gbps and more commonly at 40 and 100 Gbps with roadmap plans well beyond 100 Gbps.

In an embodiment, elements of the LAN switching fabric are identified by layer 2 identifiers from the same subnet. For example, when the fabric switches 104 support INFINIBAND, the Source Local Identifiers (SLIDs) and the Destination Local Identifiers (DLIDs) are from the same subnet even though some elements of the LAN switching fabric are separated by the WAN.

The cluster file system clients 116 and 124 are also connected directly to the fabric switches 104. The cluster file system clients allow access to the cluster file system and/or SAN 102 via cluster file system based applications.

The clustered file system/SAN node 118 is connected to the switch fabric 104 of the local cluster client 130. The clustered file system/SAN node is also connected to network nodes 122 that support IP network based applications that enable remote file access (e.g., reads/writes).

The WAN 112 is a wide area network that provides a WAN service such as a point-to-point Optical (SONET, SDH, or OTN) datagram service, and point-to-point and point-to-multi-point full rate or partial-rate Ethernet service, layer 2 VPN (virtual private network) service, an MPLS-TE service, a dark fiber connection, and/or a satellite connection. Use of the WAN service often includes connectivity to a logical WAN connection where the logical WAN connection has attributes such as source and destination addresses used for routing traffic in a manner compatible with the logical tunnel type, and some amount of bandwidth assigned with a priority of transmission.

As illustrated in FIG. 1, there is a fabric extension function 110 connected between each fabric switch 104 and the WAN 112. In an embodiment, each fabric extension function is realized as a physical network device that sits between the corresponding LAN switch fabric and the WAN. For example, the physical network device includes a LAN switching fabric physical interface that connects to the corresponding fabric switch via a transmission medium such as a wire or optical fiber and a WAN physical interface that connects to a WAN physical interface of another WAN device via a transmission medium such as a wire, an optical fiber, or a wireless medium in the case of, for example, a satellite connection.

In an embodiment, the fabric extension functions 110 manage the traffic between the local cluster client 130, the remote cluster nodes 132, and file system clients 116, 118, and 124 to minimize datagram loss, congestion, and degradation of network performance. Each fabric extension function is configured to network and communicate with all other fabric extension functions over the physical or logical WAN connections that are discovered, registered, and configured as pseudo-ports. In an embodiment, fabric extension involves combining one or more LAN switch fabrics, each with individual physical interfaces. Over each physical local interface, the fabric extension function uniquely and distinctly interacts with the individual fabric protocol to implement interface operations such as initialization, identification, detection, active management, datagram routing, filtering, multicasting, forwarding, fault detection and recovery, statistics gathering and reporting, rate limiting, flow control participation, and interface enabling and disabling.

Figure 2:
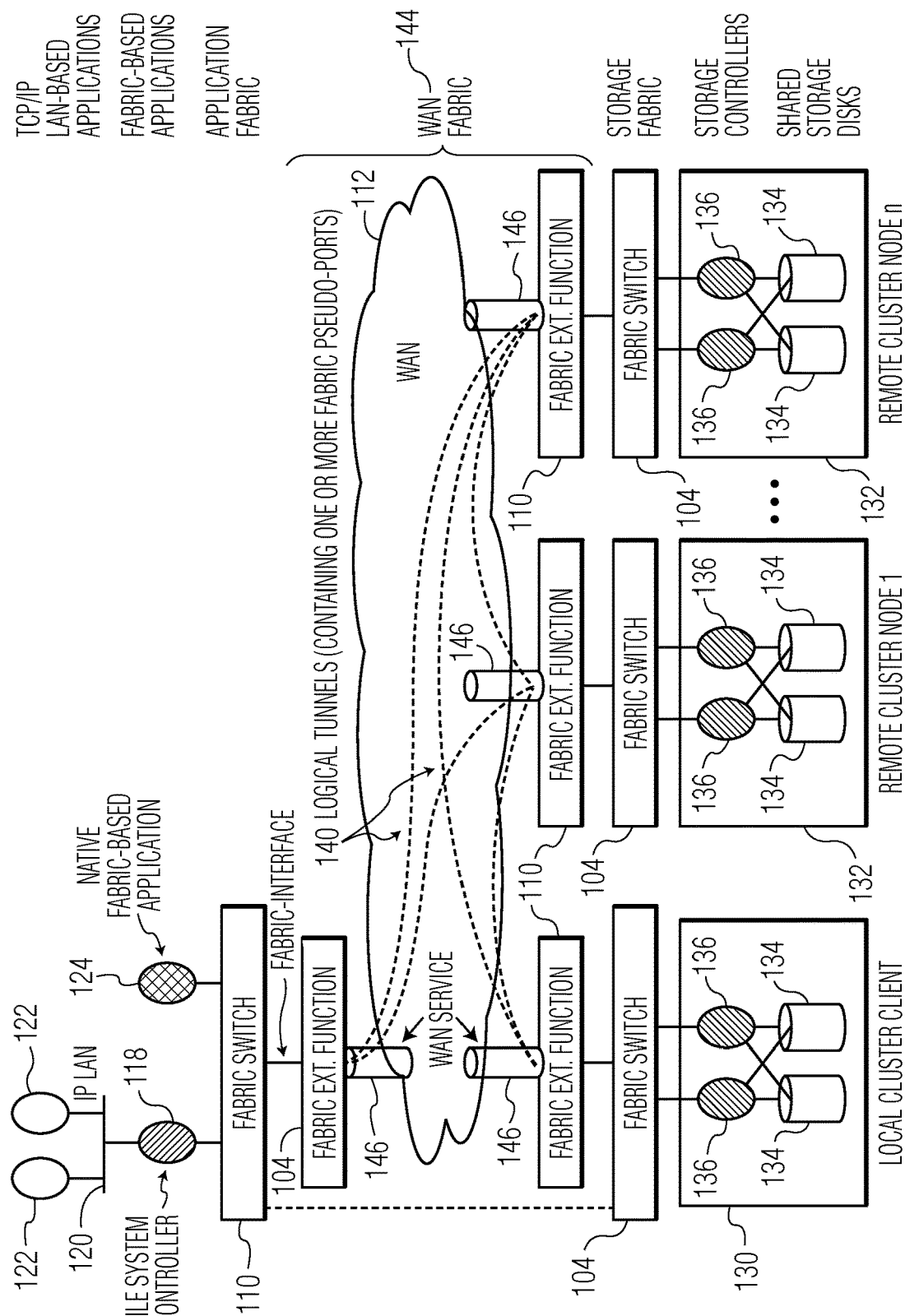
FIG. 2 illustrates a mesh of logical tunnels used to establish the WAN fabric.

FIG. 2 illustrates a mesh of logical and physical WAN connections used to establish the WAN extension fabric that networks fabric extended pseudo-ports. In an embodiment, the pseudo-ports allow the WAN to operate exactly as the network fabric operates when the fabric is constrained to the data or computing center. Mesh, partial mesh, or hub and spoke logical WAN topologies are able to support point-to-point and multicast WAN fabric networking. In particular, FIG. 2 illustrates logical tunnels 140 that connect various fabric extension functions 110 to create an extended WAN fabric 144. With reference to FIG. 2, the system includes a local cluster client 130, remote cluster nodes 132 (nodes 1 to n), fabric switches 104, fabric extension functions 110, and a WAN 112 similar to FIG. 1. The local cluster client and the remote cluster nodes include shared storage disks 134 and storage controllers 136 and, in an embodiment, the local cluster client and the remote cluster nodes are combined by the fabric extension functions into a unified cluster file system and/or a SAN 102 as illustrated in FIG. 1. The system also includes ancillary elements such as a node 124 that supports a native fabric-based application and a node 118 that supports a file system controller. In an embodiment, the native fabric-based application is an RDMA application. The file system controller can be connected, via an IP LAN 120, to nodes 122 that support TCP/IP LAN-based applications.

In the embodiment of FIG. 2, the WAN fabric 144 connects an application fabric and storage fabric. In an embodiment, the application fabric connects compute elements (e.g., processors) and the storage fabric connects storage elements (e.g., disk drives and/or flash drives).

A fabric switch 104 is associated with the local cluster client 130, with each remote cluster node 132, and with the nodes 118 and 124 that support the file system controller and the native fabric-based application. In an embodiment, the fabric switches manage traffic within the corresponding cluster and manage the ingress of traffic to the cluster and the egress of traffic from the cluster. A fabric switch may also manage traffic ingress from and egress to the file system controller and the native fabric-based application. In an embodiment, the LAN fabrics (e.g., the application fabric and the storage fabric) may include multiple multi-level no-loss fabric switches that connect to network interfaces contained within, for example, the access nodes and the storage controllers and/or the shared storage disks. The network interfaces commonly use methods of pro-active and reactive flow control as well as end-to-end coordination of send and receive buffer conditions for a given transmission of datagrams to prevent network congestion and loss. Low-loss and lossless low-latency network technologies currently include INFINIBAND, Fibre channel, and datacenter variants of Ethernet including datacenter bridging (DCB), IEEE 802.3Qbb, IEEE 802.1Qaz, IEEE 802.1Qau, and Open Fabrics RDMA over converged Ethernet (RoCE).

The WAN 112 is a wide area network that provides a WAN service such as a point-to-point Optical (SONET, SDH, or OTN) datagram service, and point-to-point and point-to-multi-point full rate or partial-rate Ethernet service, layer 2 VPN (virtual private network) service, an MPLS-TE service, and/or a dark fiber connection. In FIG. 2, WAN services are indicated by WAN service elements 146. Use of a WAN service often includes connectivity to a logical WAN connection where the logical WAN connection (e.g., a logical WAN tunnel/interface) has attributes such as source and destination addresses and/or labels used for routing traffic in a manner compatible with the logical tunnel type, and some amount of bandwidth assigned with a priority of transmission.

As illustrated in FIG. 2, there is a fabric extension function 110 connected between each fabric switch 104 and the WAN 112. In an embodiment, each fabric extension function is realized as a physical network device that sits between the corresponding switch fabric and the WAN. For example, the network device includes a LAN switching fabric physical interface that connects to the corresponding fabric switch via a transmission medium such as a wire or optical fiber and a WAN physical interface that connects to a WAN physical interface of another WAN device via a transmission medium such as a wire, an optical fiber, or a wireless medium in the case of, for example, a satellite connection.

In an embodiment, the fabric extension functions 110 manage the traffic between the local cluster client 130, the remote cluster nodes 132, and the file system clients 118, 122, and 124 to minimize datagram loss, congestion, and degradation of network performance, thereby creating the WAN fabric 144. Each fabric extension function will network and communicate with all other fabric extension functions over the physical or logical WAN connections that are discovered, registered, and configured as pseudo-ports. In an embodiment, fabric extension involves combining one or more LAN switch fabrics, each with individual physical interfaces. Over each physical local interface, the fabric extension function is configured to uniquely and distinctly interact with the individual fabric protocol for fabric interface operations such as initialization, identification, detection, active management, datagram routing, filtering, multicasting, and forwarding, fault detection and recovery, statistics gathering and reporting, rate limiting, flow control participation, and interface enabling and disabling.

Further, each fabric extension function 110 is capable of interfacing with a WAN service 146 in order to facilitate connectivity with the networked LAN fabrics. The WAN service type may include a point-to-point Optical (SONET, SDH, or OTN) datagram service, and point-to-point and point-to-multi-point full rate or partial-rate Ethernet service, a layer 2 VPN (virtual private network) service, an MPLS-TE service, or dark fiber connections. In an embodiment, a logical tunnel 140 can be an MPLS path/tunnel, a VPN, OTN path, or any other WAN logical path. Multiple pseudo-ports can be carried across the WAN in the same logical tunnel if the pseudo-ports have the same destination in the WAN (e.g., site A to site B across the WAN).

The WAN fabric 144 allows accessing, communicating and sharing digital data that resides beyond a local environment that is remotely accessible over a WAN connection by extending multiple and concurrent high performance, low-loss layer 2 LAN switch fabrics between two or more remote nodes (where a node is often a LAN). The fabric extension functions 110 establish any number of end-to-end credit buffered layer 2 dynamic pseudo-ports, assigned to logical WAN tunnels that interact with the switch fabric LANs to provide a lossless layer 2 WAN fabric. This WAN Fabric can efficiently utilize the aggregate bandwidth provided over the WAN connections, often sustaining greater than 94% utilization of the available bandwidth.

The WAN fabric 144 enables, for example, global data center connectivity, remote storage connectivity, remote collaboration, broadcast media production/distribution and which can in turn enable dynamic fabric services such as Fabric-as-a-Service (FaaS), Storage-as-a-Service (SaaS), and Infrastructure-as-a-Service (IaaS).

FIG. 3 illustrates some of the various options of extending virtual Ethernet LAN (DCB, RoCE, 802.3), virtual lanes (for INFINIBAND), logical source destination flows, or physical layer 2 fabrics to pseudo-ports in a 1:1 or 1:many multicast. In an embodiment, all fabric characteristics for buffer and flow control (e.g., credit-based flow control and/or XON/XOFF flow control) are also extended and interact with a WAN extension processor within the fabric extension functions. In the embodiment of FIG. 3, physical fabric interfaces 150, physical WAN interfaces 152, and the fabric extension function 110 are embodied as a network device 156 that sits between, for example, a LAN fabric 158 (e.g., a data center) and a WAN 112. In an embodiment, the physical fabric interfaces are connected to a LAN fabric or LAN fabrics. As illustrated in FIG. 3, the upper physical fabric interface is connected to a first LAN fabric and the lower two physical interfaces are connected to a second LAN fabric. As is known in the field, physical LAN interfaces may support multiple logical LAN interfaces 160 and the logical LAN interfaces may support multiple LAN fabric virtual LAN ports 162. In an embodiment in which the physical fabric interface is an INFINIBAND physical interface, the logical LAN interfaces may be embodied as INFINIBAND fabric Virtual Lanes (VLs) and the LAN fabric virtual LAN ports may be embodied as INFINIBAND local identifiers (LIDs) and/or global identifiers (GIDs). In an embodiment in which the physical fabric interface is an Ethernet interface, the logical LAN interfaces may be embodied as Ethernet fabric VLANs or MAC addresses and the LAN fabric virtual LAN ports may be embodied as IP-tuples (e.g., source IP address, destination IP address, source port, destination port, and protocol) and pseudowires, e.g., pseudowires according to the pseudowire emulation edge-to-edge (PWE-3) protocol.

In an embodiment, the physical WAN interfaces 152 are connected to the WAN 112 or WANs, e.g., to a network element that supports the WAN. Different physical WAN interfaces can be connected to the same WAN and/or different physical WAN interfaces can be connected to different WANs. In an embodiment, the physical WAN interfaces may be embodied as, for example, Ethernet, SONET, OTN, or SDH physical WAN interfaces. The physical WAN interfaces may support multiple logical WAN interfaces 164 and the logical WAN interfaces may support multiple pseudo-ports 166 also referred to as WAN fabric pseudo-ports. In an embodiment, a logical WAN interface may be embodied as an MPLS label switch path (LSP) and a WAN fabric pseudo-port may be mapped to, for example, an MPLS PWE3.

As illustrated in FIG. 3, logical LAN interfaces 160, physical fabric interfaces 150, and LAN fabric virtual LAN ports 162 on the LAN fabric side of the fabric extension function 110 are mapped to a pseudo-port 166 or pseudo-ports on the WAN side of the fabric extension function. For example, a logical LAN interface is mapped to a pseudo-port or pseudo-ports (e.g., 1:1 or 1:many (multicast)) as indicated by connecting arrow 170, a physical fabric interface is mapped to a pseudo-port or pseudo-ports as indicated by connecting arrow 172, and a LAN fabric virtual LAN port is mapped to a pseudo-port or pseudo-ports (1:1 or 1:many (multicast)) as indicated by the connecting arrow 174. In an embodiment, a user programs fabric interface-to-pseudo-port mappings in the fabric extension function through a command line interface or other configuration/management tool. In an embodiment, parameters of pseudo-ports and fabric interface-to-pseudo-port the mappings are programmed into registers of the components of the corresponding network device, e.g., into classification module and/or system encapsulation module.

FIG. 4A illustrates an example of a link state packet 178 and a flow control packet 180 used between the WAN extension functions across the WAN. These pseudo-port packets are an integral communication function of the pseudo-ports. In an embodiment, pseudo-link packets are used to bring up a link across the WAN and the pseudo-flow control packets are used to implement flow control on a link. In an embodiment, the link state and flow control packets have formats that correspond to the INFINIBAND frame format of the Local Routing Header (LRH). For example, the link state and flow control packets use the same LRH header format as in INFINIBAND. As illustrated in FIG. 4A, the pseudo-link packet has sixteen 32-bit words with fields as follows:

VL[3:0]=Virtual Lane
LV[3:0]=Link Version
SL[3:0]=Service Level
T[1:0]=Type
LNH[1:0]=Link Next Header
DLID[15:0]=Destination Local ID
RSVD[4:0]=Reserved
PLEN[10:0]=Packet Length
SLID[15:0]=Source Local ID
LSOPCODE[7:0]=Link State Opcode (00=debounce; 01=linkInitReq; 10=linkInitAck or linkInitialized)
LINKSTATE[7:0]=Link State (00=DOWN; 01=INIT; 10=ARM; 11=ACTIVE)
RSVD=Reserved (set to 0)

In an embodiment, the VL field carries a pseudo-port identifier. In an embodiment, the Type field is set to "0" to indicate that the pseudo-port packet is a pseudo-link packet and is set to "1" to indicate that the pseudo-port packet is a pseudo-flow control packet. In an embodiment, the SLID field is set to a known value (e.g., hexadecimal CAFE) to indicate, as a check, that the packet is a pseudo-link packet. In an embodiment and as is described below, the LSOP-CODE field is used to set up a link across the WAN and the LINKSTATE field is used to indicate the state of a link.

As illustrated in FIG. 4A, the pseudo-flow control packet 180 has sixteen 32-bit words with fields as follows:
VL[3:0]=Virtual Lane
LV[3:0]=Link Version
SL[3:0]=Service Level
T[1:0]=Type
LNH[1:0]=Link Next Header
DLID[15:0]=Destination Local ID
RSVD[4:0]=Reserved
PLEN[10:0]=Packet Length
SLID[15:0]=Source Local ID
FCTBS[31:0]=Flow Control Transmit Blocks Sent
FCCL[31:0]=Flow Control Credit Limit
RSVD=Reserved (set to 0)

In an embodiment, the VL field is set to the queue number that corresponds to the pseudo-port and that is used for flow control. In an embodiment, the Type field is set to "0" to indicate that the packet is a pseudo-link packet and is set to "1" to indicate that the packet is a pseudo-flow control packet. In an embodiment, the SLID field is set to a known value (e.g., hexadecimal BEEF) to indicate, as a check, that the packet is a pseudo-flow control packet. In an embodiment, the FCTBS field is used to set a running count of the number of blocks sent. In an embodiment, the FCCL field is used to set a running count of the number of credits available, which enables credit-based flow control across the WAN.

Although particular examples of the pseudo-port packet formats are described with reference to FIG. 4A, other pseudo-port packet formats are possible.

Figure 4B:
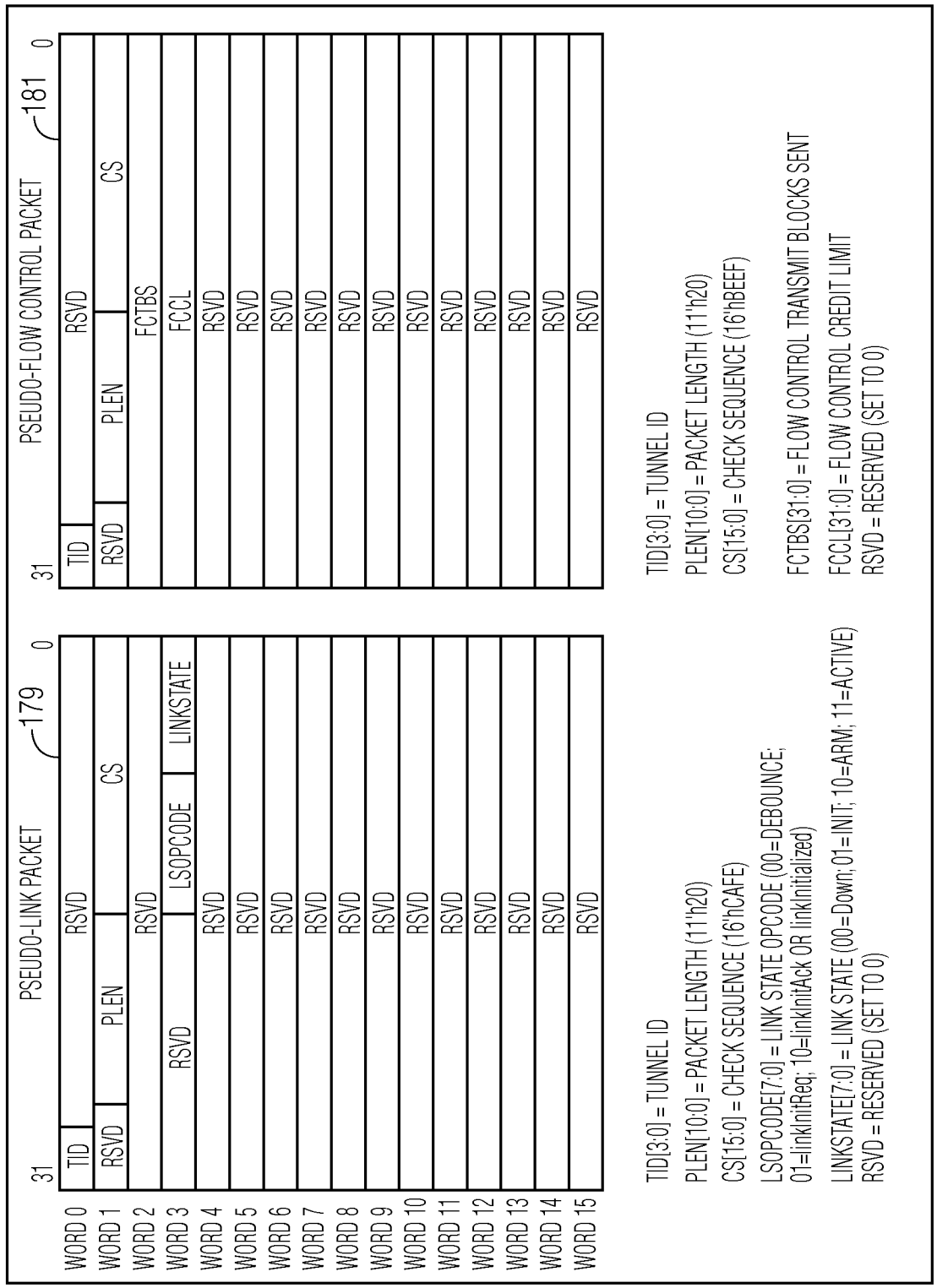
FIG. 4B illustrates additional examples of a pseudo-link packet and a pseudo-flow control packet, which are used between WAN extension functions across a WAN.

FIG. 4B illustrates another example of a link state packet 179 and a flow control packet 181 used between the WAN extension functions across the WAN. In an embodiment, pseudo-link packets are used to bring up a link (e.g., via a pseudo-port) in the WAN and the pseudo-flow control packets are used to implement flow control on the link. As illustrated in FIG. 4B, the pseudo-link packet has sixteen 32-bit words with fields as follows:
TID[3:0]=Tunnel ID
PLEN[15:0]=Packet Length (11'h20)
CS[15:0]=Check Sequence (16'CAFE)
LSOPCODE[7:0]=Link State Opcode (00=debounce; 01=linkInitReq; 10=linkInitAck or linkInitialized)
LINKSTATE[7:0]=Link State (00=DOWN; 01=INIT; 10=ARM; 11=ACTIVE)
RSVD=Reserved (set to 0)

In an embodiment, the TID field carries a pseudo-port identifier that identifies the corresponding pseudo-port. In an embodiment, the CS field is set to a known value (e.g., hexadecimal CAFE) to indicate, as a check, that the packet is a pseudo-link packet. In an embodiment, the LSOPCODE field is used to set up a link (e.g., via a pseudo-port) across the WAN and the LINKSTATE field is used to indicate the state of a link.

As illustrated in FIG. 4B, the pseudo-flow control packet 181 has sixteen 32-bit words with fields as follows:
TID[3:0]=Tunnel ID
PLEN[15:0]=Packet Length (11'h20)
CS[15:0]=Check Sequence (16'BEEF)
FCTBS[31:0]=Flow Control Transmit Blocks Sent
FCCL[31:0]=Flow Control Credit Limit
RSVD=Reserved (set to 0)

In an embodiment, the TID field is set to the queue number that corresponds to the pseudo-port and that is used for flow control. In an embodiment, the CS field is set to a known value (e.g., hexadecimal BEEF) to indicate, as a check, that the packet is a pseudo-flow control packet. In an embodiment, the FCTBS field is used to set a running count of the number of blocks sent. In an embodiment, the FCCL field is used to set a running count of the number of credits available, which enables credit-based flow control across the WAN.

FIG. 4C illustrates another example packet format in which fields for establishing a pseudo-link and fields for implementing flow control are included in the same packet. FIG. 4C illustrates an example of a pseudo-port packet 183, which is used between the WAN extension functions across the WAN. In an embodiment, pseudo-port packets, such as the packet shown in FIG. 4C, are used to bring up a link (e.g., via a pseudo-port) in the WAN and to implement flow control on a link. As illustrated in FIG. 4C, the pseudo-port packet has sixteen 32-bit words with fields as follows:
TID[7:0]=Tunnel ID
PLEN[15:0]=Packet Length
CC[31:0]=Check Code (hardcoded to 0xcafebeef)
LOP[3:0]=Link State Opcode (00=debounce; 01=linkInitReq; 10=linkInitAck or linkInitialized)
PS[1:0]=Pseudo-port State (00=DOWN; 01=INIT; 10=ARM; 11=ACTIVE)
FCTBS[39:0]=Flow Control Transmit Blocks Sent
FCCL[39:0]=Flow Control Credit Limit
RSVD=Reserved (set to 0)

In an embodiment, the TID field is set to identify the pseudo-port that corresponds to the packet. In an embodiment, the Check Code field is a field that is set to a known value (e.g., hexadecimal CAFEBEEF) to indicate, as a check, that the packet is a pseudo-port packet. In an embodiment, the LOP field is used to set up a link (e.g., via a pseudo-port) across the WAN and the PS field is used to indicate the state of a link. In an embodiment, the FCTBS field is used to set a running count of the number of blocks sent. In an embodiment, the FCCL field is used to set a running count of the number of credits available, which enables credit-based flow control across the WAN.

Figure 5:
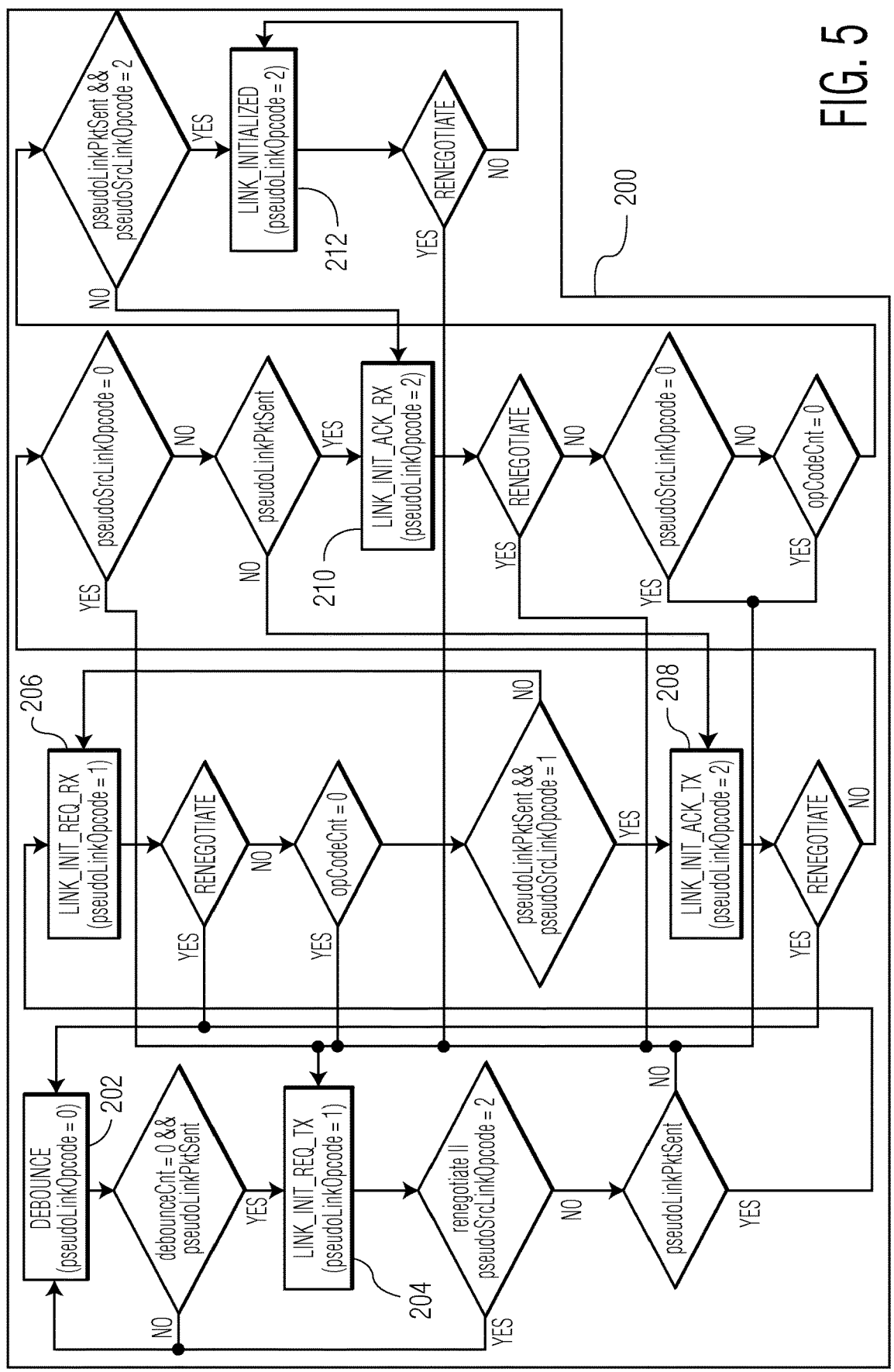
FIG. 5 is a state transition diagram of operation of a link initiation state machine for establishing a link at a fabric extension function.

As stated above, each WAN fabric extension function will network and communicate with all other fabric extension functions over the physical or logical WAN connections that are discovered, registered and configured as pseudo-ports. In an embodiment, a pseudo-port refers to a logical WAN connection that allows the emulation of a layer 2 fabric port to be extended across the low-loss WAN fabric. FIG. 5 illustrates a state transition diagram for establishing the coupling of LAN fabrics across a WAN for a stateful operation between fabric extension functions and the multiple LAN fabrics. In an embodiment, the states are held in a link initialization state machine 200 at the fabric extension functions and the states are managed using the above-described pseudo-port packets. In an embodiment, the links established through pseudo-ports and pseudo-port packet communications are referred to as pseudo-links or simply links and the terms pseudo-port and pseudo-link are used interchangeably. As illustrated in FIG. 5, the link states are: DEBOUNCE, LINK_INIT_REQ_TX, LINK_INIT_REQ_RX, LINK_INIT_ACK_TX, LINK_INIT_ACK_RX, and LINK_INITIALIZED. The link states are described as follows:
DEBOUNCE: This is the first state of the link initialization negotiation. The purpose of debounce is to make sure that both sides of the link go fully down and start the negotiation from the same point in the state machine. The debouncePeriod field is used to define the amount of time to wait in the DEBOUNCE state before allowing the transition to LINK_INIT_REQ_TX. The debouncePeriod field defines the number of link state packets that must be received prior to any state transition. During the DEBOUNCE state, the pseudoLinkOpcode is 0x0.

LINK_INIT_REQ_TX: This is the start of the negotiation, and when the linkInitReq packets are first transmitted. If a renegotiation is initiated or the pseudoLinkOpcode being received is 0x2, then the state machine returns to DEBOUNCE (see explanation of renegotiation below). A received pseudoLinkOpcode of 0x2 indicates that the two state machines are not in lock-step and the negotiation should begin again. If the state machines are in sync, then state transitions to LINK_INIT_REQ_RX once a pseudo link state packet has been sent. During the LINK_INIT_REQ_TX state, the pseudoLinkOpcode is 0x1.

LINK_INIT_REQ_RX: This state is used to wait for the reception of a linkInitReq packet. If a renegotiation is initiated, then the state machine returns to DEBOUNCE. If the opCodeCnt reaches 0x0 then the state machine returns to LINK_INIT_REQ_TX. The opCodeCnt counts down every time a pseudo link state packet is received. If the opCodeCnt reaches 0, then this indicates that there have been 256 link state packets received without any of the packets having a pseudoLinkOpcode of 0x1. Once a pseudo link state packet has been sent and a pseudo link packet is received with a pseudoLinkOpcode of 0x1, the state machine transitions to LINK_INIT_ACK_TX. During the LINK_INIT_REQ_RX state, the pseudoLinkOpcode is 0x1.

LINK_INIT_ACK_TX: This state is used to start transmitting linkInitAck packets. If a renegotiation is initiated then the state machine returns to DEBOUNCE. If a pseudoLinkOpcode of 0x0 is received then the state machine transitions back to LINK_INIT_REQ_TX because the two state machines are not in lock step and negotiation must begin again. If the state machines are in sync, then the state machine transitions to LINK_INIT_REQ_RX once a pseudo link state packet has been set. During the LINK_INIT_ACK_TX state, the pseudoLinkOpcode is 0x2.

LINK_INIT_ACK_RX: This state is used to wait for the reception of a linkInitAck packet. If a renegotiation is initiated then the state machine returns to DEBOUNCE. If the received pseudoLinkOpcode is 0x0, indicating the two state machines are not in lock step, or the opCodeCnt reaches 0x0, then the state machine returns to LINK INIT REQ TX. If the opCodeCnt reaches 0x0, then this indicates there have been 256 link state packets received without any of the packets having a pseudoLinkOpcode of 0x2. Once a pseudo link state packet has been sent and a pseudo link packet is received with a pseudoLinkOpcode of 0x2 the state machine transitions to LINK_INITIALIZED. During the LINK_INIT_ACK_RX state, the pseudoLinkOpcode is 0x2.

LINK_INITIALIZED: This state is the operational state and indicates the link initialization is complete. Once this state is reached, the link is free to transition to the INIT state, and subsequently ARM and ACTIVE. The only transition from this state is to DEBOUNCE due to a renegotiation, which occurs following any link event that indicates the link is down. In an embodiment, events that will cause a renegotiation are as follows:

Pseudo Link Timeout—This occurs when no pseudo link packets are received within the time period specified by pseudoLinkStatePer.

Far End Pseudo-Port Goes Down—This is detected when the received pseudo link state transitions from non-zero to zero.

Pseudo Port is Forced Down—This is detected when the loadPseudoSWLinkState changes to 0x1 and the pseudoLinkState is 0x0.

Far End is in DEBOUNCE and local end is not in DOWN state—If the local end detects that the far end is DOWN and in the DEBOUNCE state, but it is not DOWN then a renegotiation must occur.

Figure 6:
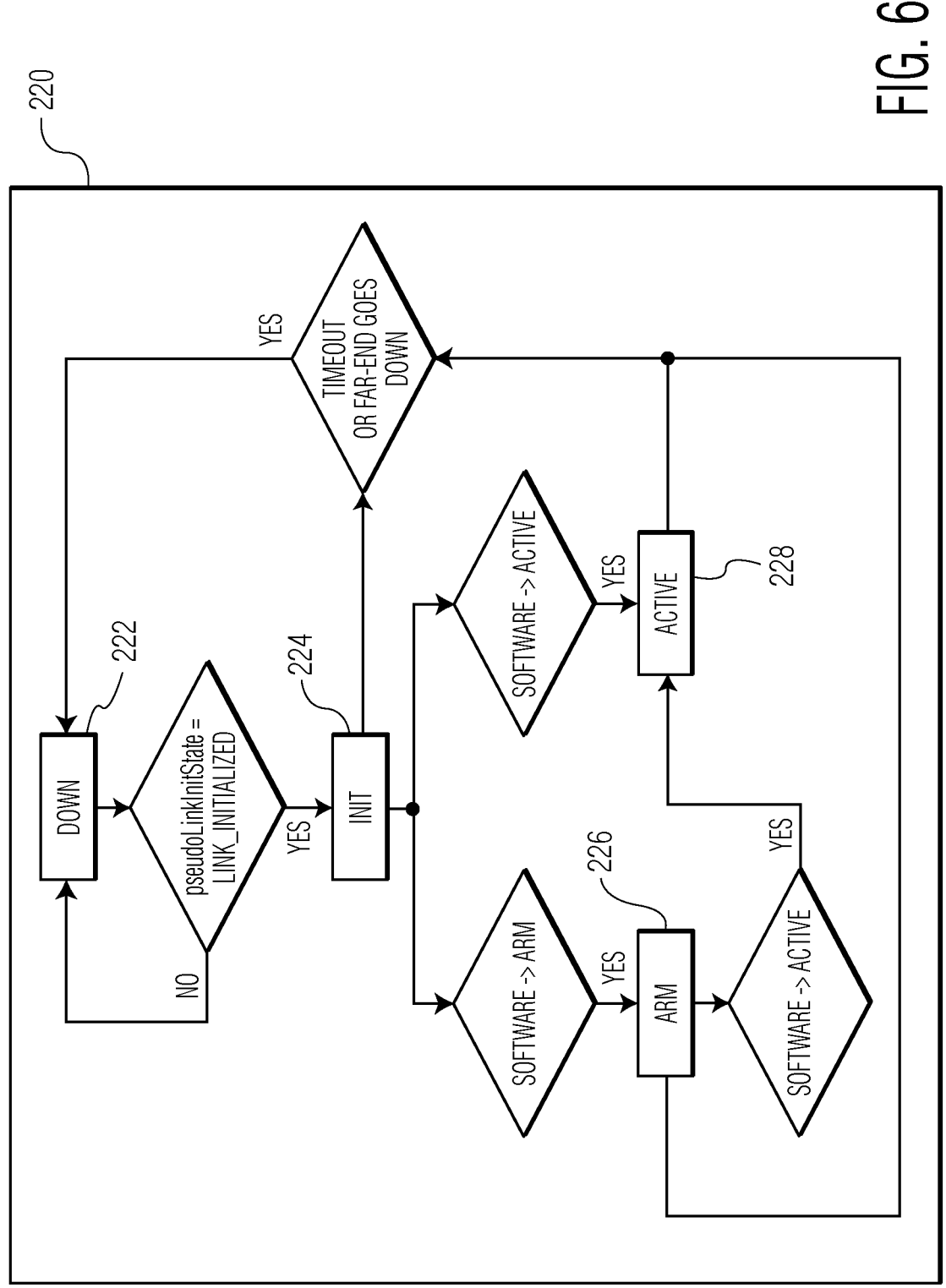
FIG. 6 is a state transition diagram of operation of a link state machine for managing a link at a fabric extension function.

Once a link initialization state machine reaches LINK_INITIALIZED, a link state machine at the fabric extension function can begin its transitions. FIG. 6 illustrates a link state machine, along with an explanation of each state.

Operation of the link initiation state machine 200 of a fabric extension function 110 is illustrated in the state diagram of FIG. 5. The DEBOUNCE state is indicated at block 202, the LINK_INIT_REQ_TX state is indicated at block 204, the LINK_INIT_REQ_RX state is indicated at block 206, the LINK_INIT_ACK_TX state is indicated at block 208, the LINK_INIT_ACK_RX state is indicated at block 210, and the LINK_INITIALIZED state is indicated at block 212.

FIG. 6 illustrates a state transition diagram of a link state machine 220 for managing pseudo-ports at a fabric extension function. As illustrated in FIG. 6, the link states are: DOWN, INIT, ARM, and ACTIVE. The link states are described as follows:

DOWN: The DOWN state is the initial state following a reboot or whenever there is a problem with the link. Once the pseudo link initialization is complete, which is indicated by the pseudoLinkInitState being LINK_INITIALIZED, the state transitions to INIT.

INIT: The INIT state is achieved once the link initialization is complete. Once in INIT, software is responsible for transitioning to the next state. Software can either transfer to ARM first or directly to ACTIVE.

ARM: The ARM state is a transitory state that is simply a step to the ACTIVE state. In an embodiment, the ARM state is not necessary and software can transition straight from INIT to ACTIVE.

ACTIVE: The ACTIVE state is the operational state and once in this state normal data flow is allowed. The only way to transition from this state is via software or if the link goes down. All four of the states will transition to the DOWN state whenever a pseudo link timeout occurs or if the far end goes down.

In FIG. 6, the DOWN state is indicated at block 222, the INIT state is indicated at block 224, the ARM state is indicated at block 226, and the ACTIVE state is indicated at block 228.

In an embodiment, parameters to implement pseudo-ports are held in pseudo-port registers at each fabric extension function. For example, registers include registers for storing pseudo-link configuration information, registers for storing pseudo-link state information, registers for holding pseudo-link flow control configuration information. In an embodiment, pseudo-link configuration information includes pseudo-link opcode information, debounce period (used to ensure that both the local and far end systems go completely down and start the negotiation from the same point), timeout period information, pseudo-link state information includes the current pseudo-link opcode of the source of the (far end) pseudo-link state packets, the current pseudo-link opcode at the current system, the current state of the source of the (far end) pseudo-link state packets and the current state of the pseudo-link at the current system, and pseudo-link flow control configuration information includes data buffer size, maximum packet size, timeout period for pseudo-flow control packets.

In an embodiment, the fabric extension function 110 on the transmitter side keeps a running count of the number of blocks transmitted, referred to as the Blocks Transmitted Count (BTC). In an embodiment, the BTC is incremented every clock cycle in which a data word is transmitted. This is true regardless of the number of bytes transmitted during the clock cycle. The transmitter sends flow control packets at a frequency defined by pseudoFCTxRate (PSEUDO_FC_TX_RATE register). The value of the BTC is placed in the FCTBS field of the flow control packet. The fabric extension function and the transmitter side must also decide when there is enough buffer space to send a maximum sized packet. This determination is made by taking the FCCL (the buffer size defined by pseudoFCBufSize+the BRC, which is blocks received count), subtracting the BTC, and verifying that the difference is greater than the maximum packet size. The maximum packet size is defined in the pseudoFCMaxSize field (e.g., in a PSEUDO_FC_CFG Register).

In an embodiment, the fabric extension function 110 on the receiver side keeps a running count of the blocks of data received and holds this value in the Blocks Received Count (BRC). The BRC is incremented every clock cycle in which a data word is pulled from the buffer. Whenever a flow control packet is received, the BRC is compared against the FCTBS field from the flow control packet. These values should be the same, but they could differ due to loss of packets. The fabric extension function on the receiver side indicates a mismatch via a BTCBRCMismatch interrupt (the interrupt is for debug purposes only and defaults to being masked). The fabric extension function at the receiver side always resynchronizes to the fabric extension function on the transmitter side by loading the FCTBS value into the BRC. The fabric extension function on the receiver side is also responsible for sending the FCCL value to the fabric extension function on the transmitter side. The FCCL value is calculated by adding the BRC to the buffer size defined in the pseudoFCBufSize field (e.g., in a PSEUDO_FC_CFG Register).

Figure 7:
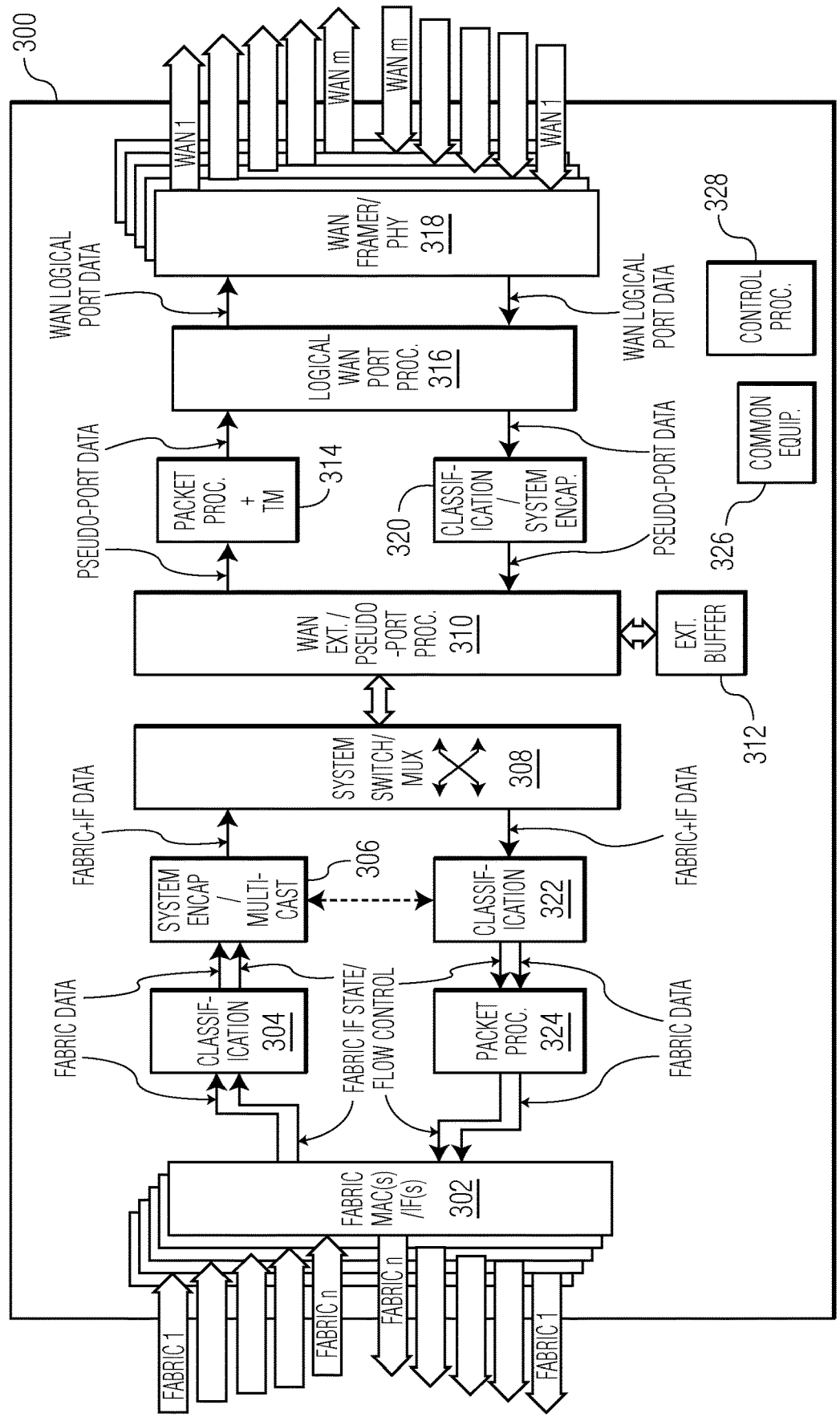
FIG. 7 depicts an example of a network device that includes a data plane for a fabric extension function.

FIG. 7 illustrates a system 300 implementation of the fabric extension function 110. This system is configurable to operate with many lossless LANs, including virtual, logical, and physical fabrics and to map pseudo-ports to many types of WAN service types. In an embodiment, the system of FIG. 7 is embodied as a network device that sits between a LAN fabric and a WAN. In the embodiment of FIG. 7, the data plane of the fabric extension function includes fabric MAC(s) and/or fabric interface(s) 302, a classification module 304, a system encapsulation/multicast module 306, a system switch/multiplexer 308, a WAN extension/pseudo-port processor 310, an external buffer 312, a packet processor and traffic management (TM) module 314, a logical WAN port processor 316, a WAN framer/physical interface 318, a classification/system encapsulation module 320, a classification module 322, and a packet processor 324.

In an embodiment, the fabric MAC(s) and/or fabric interface(s) 302 support incoming fabric traffic (identified as fabrics 1 . . . n), that is, traffic that is coming from a LAN switching fabric into the fabric extension function and outgoing fabric traffic (identified as fabrics 1 . . . n), that is, traffic that is exiting the fabric extension function to the LAN switching fabric. Such fabric MAC(s) and/or fabric interface(s) are known in the field.

The classification module 304 classifies fabric traffic and identifies packets as fabric data packets (fabric datagrams) and as pseudo-port packets (e.g., pseudo-link packets and pseudo-flow control packets). The classification module may also identify which queue the fabric data should be associated with. In an embodiment, the classification module decodes datagrams to determine logical and virtual LAN association to an input datagram buffer and an output datagram buffer. For example, the classification module maps LAN switching fabric interfaces to the corresponding pseudo-ports. The system encapsulation/multicast module 306 encapsulates the packets into frames that can be internally switched. The system switch/multiplexer 308 includes queues for switching/multiplexing the packets to the appropriate input or output interface. The WAN extension/pseudo-port processor 310 manages the flow control (e.g., credit-based flow control and/or XON/XOFF flow control) of the packets across the WAN. In an embodiment, the WAN extension/pseudo-port processor maintains internal buffers for each active pseudo-port. In an embodiment, the packet processor and traffic management module 314 generates protocol headers for traffic that will be transmitted out the WAN links and performs traffic shaping functions. The logical WAN port processor 316 manages the logical WAN interfaces and the WAN framer/physical interface 318 frames, transmits, receives, and deframes WAN data. In an embodiment, the WAN framer/physical interface supports outgoing WAN traffic (identified as WANs 1 . . . m), that is, traffic that is coming from a LAN fabric into the fabric extension function and being transmitted out the WAN framer/physical interface and incoming WAN traffic (identified as WANs 1 . . . m), that is, traffic that is entering the fabric extension function from a WAN for transmission out to a LAN switching fabric. The classification/system encapsulation module 320 classifies pseudo-port data received at the WAN framer/physical interface and encapsulates the packets into frames that can be internally switched. The classification module 322 classifies traffic received at the WAN framer/physical interface fabric traffic and identifies packets as fabric data packets (LAN fabric datagrams) or as pseudo-port packets (e.g., pseudo-link packets or pseudo-flow control packets). The packet processor 324 generates protocol headers for traffic that will be transmitted out the fabric MAC(s) and fabric interface(s). The system 300 may also include a common equipment module 326 and a control processor 328 that provide support functions, such as, console interface and management interface.

Figure 8:
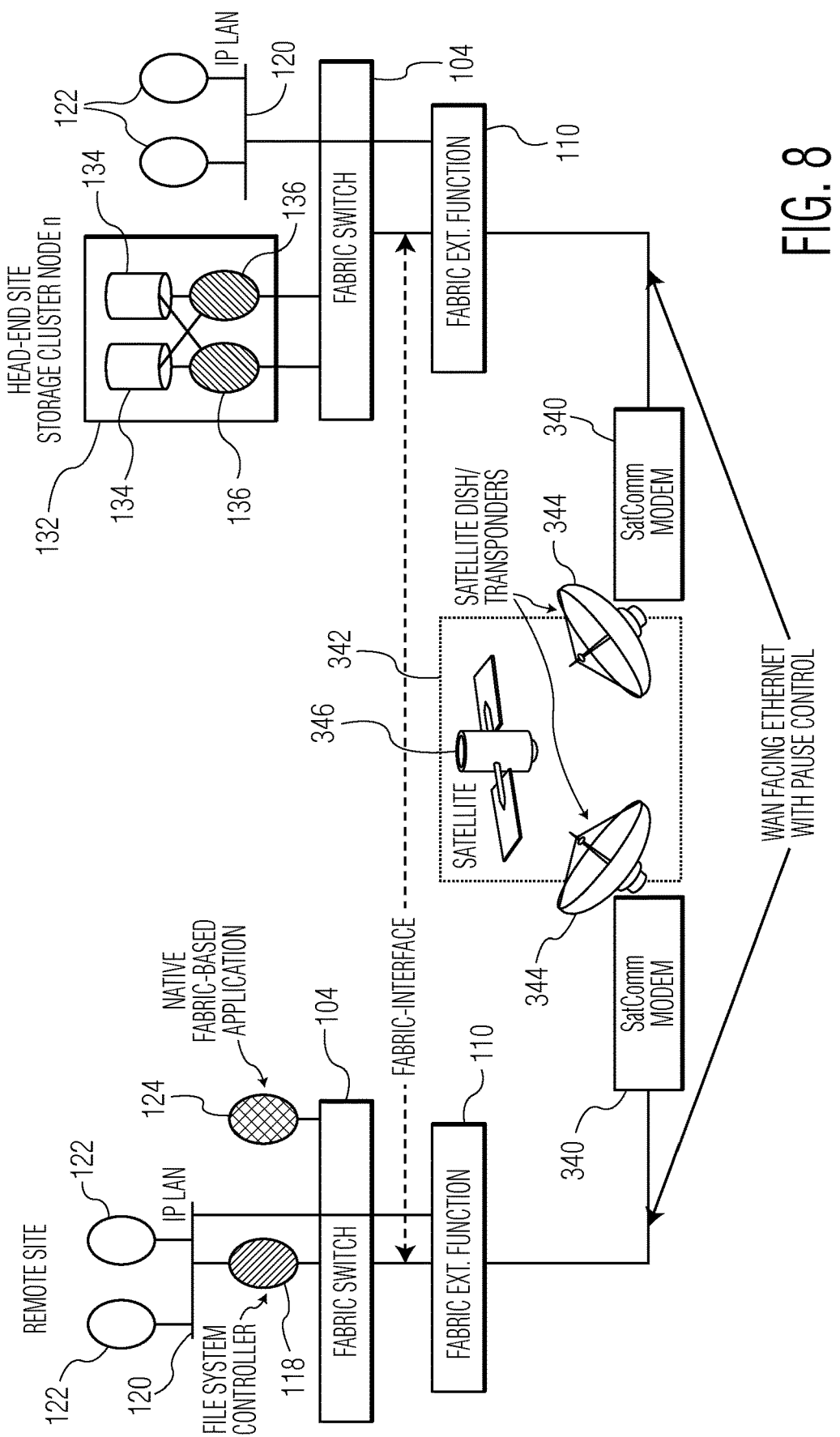
FIG. 8 depicts an embodiment of a WAN fabric that is implemented over a satellite link.

FIG. 8 depicts the case of a WAN fabric implemented over a satellite link. All LAN fabric switches, storage, compute and LAN components interface to the fabric extension function, where the lossless pseudo-port WAN extension is established and networked over the WAN facing Ethernet. The WAN Ethernet interfaces directly to the satellite ground communication package where the link is configured for layer 2 mapping to the configured satellite protocol. The ground packages (remote site and the head-end) include the SatComm modem (modulator/demodulator), the transponder and the satellite dish. The ground package is configured and set to establish a radio frequency uplink to the allocated satellite.

As stated above, FIG. 8 illustrates an example of a deployment of distributed storage and computing resources networked over an extended WAN fabric that includes a satellite link. In general, elements shown and described with reference to FIGS. 1 and 2 correspond to similar elements in FIG. 8. As illustrated in FIG. 8, the system includes a storage cluster node 132 (node n) (e.g., at a head-end site), fabric switches 104, fabric extension functions 110, and a satellite based WAN that includes SatComm modes 340 and a satellite network 342 that includes satellite dish/transponders 344 and at least one satellite 346. The storage cluster node includes shared storage disks 134 and storage controllers 136 and, in an embodiment, the storage cluster node can be combined with other storage clusters by the fabric extension functions 110 into a unified cluster file system and/or a storage area network (SAN). The system also includes ancillary elements such as a node 124 that supports a native fabric-based application and a node 118 that supports a file system controller. In an embodiment, the native fabric-based application is an RDMA application. The file system controller can be connected directly to a switch fabric 104 and/or to nodes 122 that support TCP/IP LAN-based applications.

In the embodiment of FIG. 8, the fabric extension functions 110 on each side of the WAN include WAN physical interfaces that are Ethernet interfaces with pause control. These Ethernet interfaces connect to the satellite communications modems (SatComm modems 340) and the satellite communications modems connect to the ground packages (e.g., which include the satellite dish/transponders 344). In the embodiment of FIG. 8, the two switch fabrics 104 are connected across the satellite based WAN to create a WAN fabric as described above.

Figure 9B:
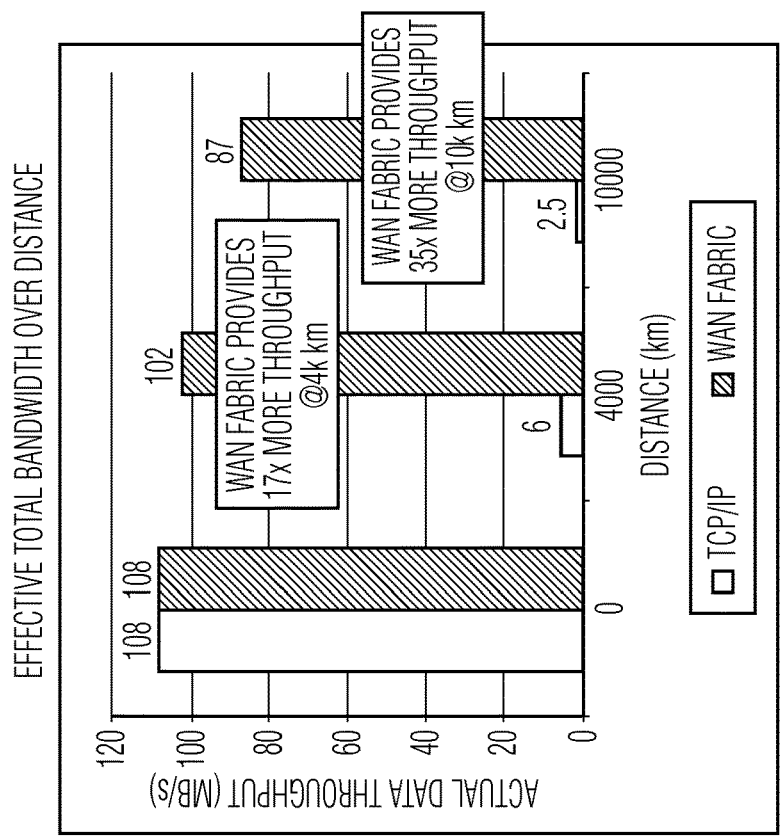
FIGS. 9A and 9B depict performance data for file transfers and effective total bandwidth utilization when accessing data across a WAN using traditional TCP/IP techniques versus a WAN fabric extension technique.
Figure 9A:
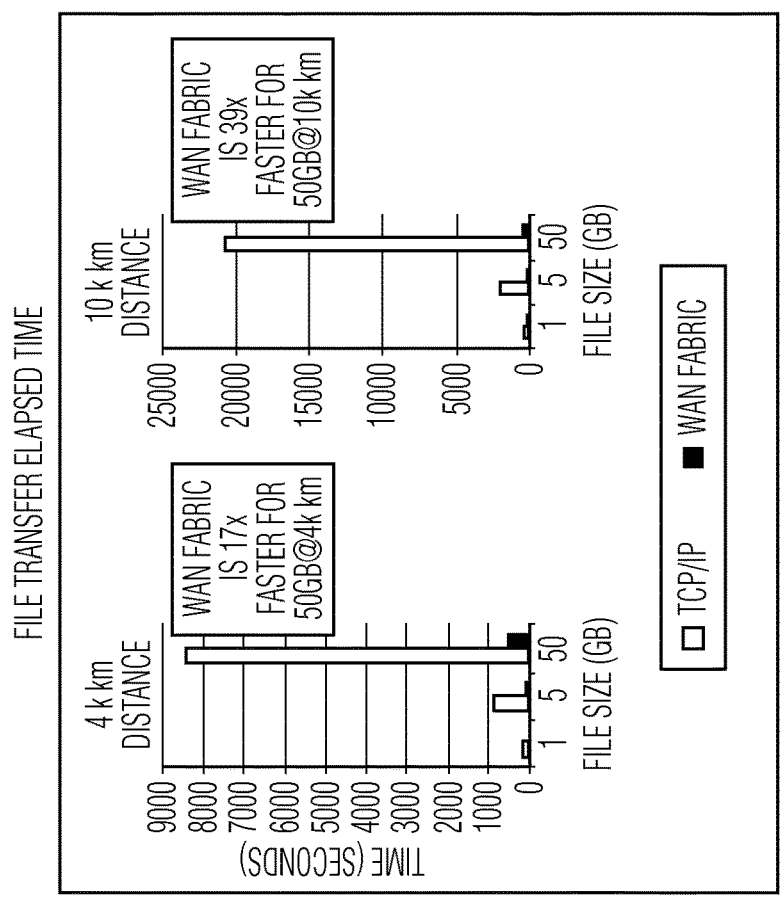

FIGS. 9A and 9B depict performance data for file transfers and effective total bandwidth utilization when accessing data across a WAN using traditional TCP/IP techniques versus a WAN fabric as described herein. The depicted performance data compares a WAN fabric technique with TCP/IP routed network. In particular, FIG. 9A provides bar graphs of file transfer elapsed time over distances of 4,000 (4k) kilometers (km) and 10,000 (10k) kilometers (km). As indicated in FIG. 9A, a WAN fabric can transfer a 50 gigabit (Gb) file 17 times faster than a conventional TCP/IP approach over a 4 k km distance and 39 times faster than a convention TCP/IP approach over a 10 k km distance. FIG. 9B provides bar graphs of effective total bandwidth (reported as actual data throughput in megabits per second (Mb/s)) over distances of 0, 4,000, and 10,000 km. As indicated in FIG. 9B, a WAN fabric can provide 17 times more throughput at a distance of 4 k km and 35 times more throughput at a distance of 10 k km. The performance information depicted in FIGS. 9A and 9B was measured on IBM's General Parallel File System (GPFS), with the GPFS client set up locally with a remote storage disk attached to a GPFS server. The WINDOWS client connection was still running TCP/IP over 1 GE locally (so nothing is different on the client side as it does a regular FTP), but it eliminates TCP/IP in the WAN by using the fabric extension function and WAN fabric as described above. Using a fabric extension function and WAN fabric as described above, the WINDOWS client accesses the remote disk attached to the GPFS server as if it were local.

The fabric extension technique described herein is a true layer 2 technology approach to extend local fabrics over a WAN (to form a WAN fabric) and not just optimize the data that traverses a conventional TCP/IP network. In addition to optimizing the data sent over the WAN, conventional WAN optimization techniques integrate compression and deduplication at the application layer. The net effect is the reduction of the amount of data being transferred and not enabling more data on the same circuit. FIG. 10 is a table that compares aspects of the disclosed WAN fabric extension technique with conventional WAN optimization controllers, application delivery controllers, and overall capacity addition. Typical WAN optimizers fall short of industry needs given that they have little to no effect on data that has already been compressed and/or encrypted, they have no awareness of the transport layer, they are not lossless or deterministic by nature, and they can actually decrease data security by making decryption easier as a result of repetitive data blocks associated with deduplication signatures. The most common use case of WAN optimizers is between remote offices and corporate headquarters to provide application-specific data synchronization or aggregation. Such WAN optimizers do not impact latency, distance limitations, or bandwidth utilization in an application-agnostic way that a true layer 2 fabric extension function can. Additionally, WAN optimization and application delivery controllers reduce the amount of data that goes into the WAN rather than increasing the utilization of what is available through the existing WAN. Capacity addition provides additional bandwidth, but is not optimal in terms of efficiency, scalability, and Total Cost of Operation (TCO).

In an embodiment, the terms "LAN switching fabric" and "LAN fabric" refer to a network topology in which different network nodes or terminals connect with each other via a number of switches, for example, crossbar switches. The topology is used in high-speed networks like Fibre Channel (FC-SW), INFINIBAND, and RAPIDIO. Such a LAN topology is the opposite of slower LAN networks such as early iterations of Ethernet and broadcast networks because a LAN switching fabric spreads traffic across multiple physical links. The more switches and physical lines, the better throughput and network disruption tolerance the network has. Additionally, the network interfaces in a LAN switching fabric commonly use pro-active and reactive flow control as well as end-to-end coordination of send and receive buffer conditions for a given transmission of datagrams to prevent network congestion and loss. Such end-to-end coordination of send and receive buffer conditions for a given transmission of datagrams does not occur in conventional LAN networks.

Figure 11:
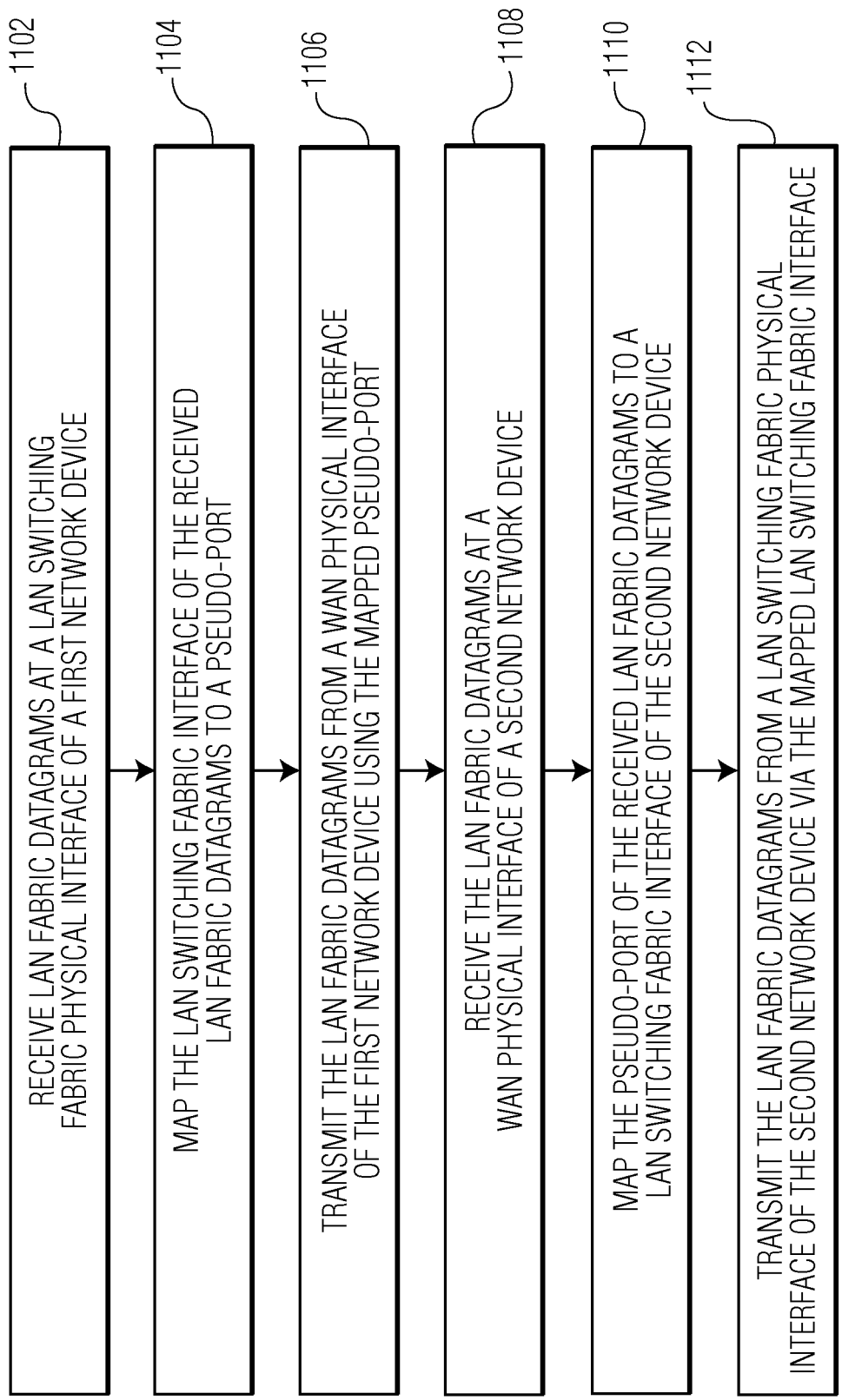
FIG. 11 is a process flow diagram of a method for accessing remote digital data over a WAN in accordance with an embodiment of the invention.

FIG. 11 is a process flow diagram of a method for accessing remote digital data over a WAN. At block 1102, LAN fabric datagrams are received at a LAN switching fabric physical interface of a first network device. At block 1104, the LAN switching fabric interface of the received LAN fabric datagrams is mapped to a pseudo-port. At block 1106, the LAN fabric datagrams are transmitted from a WAN physical interface of the first network device using the mapped pseudo-port. At block 1108, the LAN fabric datagrams are received at a WAN physical interface of a second network device. At block 1110, the pseudo-port of the received LAN fabric datagrams is mapped to a LAN switching fabric interface of the second network device. At block 1112, the LAN fabric datagrams are transmitted from a LAN switching fabric physical interface of the second network device via the mapped LAN switching fabric interface.

Figure 12:
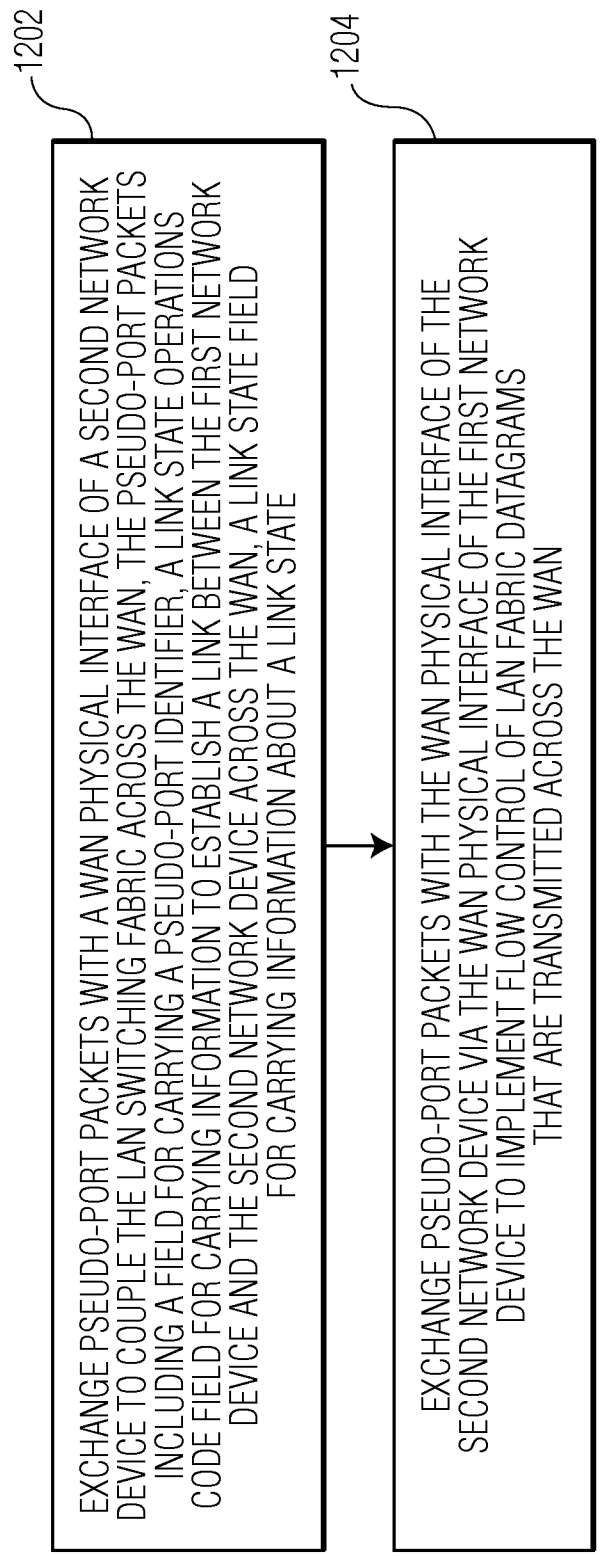
FIG. 12 is a process flow diagram of a method for accessing remote digital data over a WAN in accordance with an embodiment of the invention.

FIG. 12 is a process flow diagram of a method for accessing remote digital data over a WAN, the method involving steps at a first network device that includes a LAN switching fabric physical interface configured to communicate according to a LAN switching fabric protocol and a WAN physical interface configured to communicate according to a WAN protocol. At block 1202, pseudo-port packets are exchanged with a WAN physical interface of a second network device to couple the LAN switching fabric across the WAN, the pseudo-port packets including a field for carrying a pseudo-port identifier, a link state operations code field for carrying information to establish a link between the first network device and the second network device across the WAN, and a link state field for carrying information about a link state. At block 1204, pseudo-port packets are exchanged with the WAN physical interface of the second network device via the WAN physical interface of the first network device to implement flow control of LAN fabric datagrams that are transmitted across the WAN.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer usable storage medium for execution by a computer. As an example, an embodiment of a computer program product includes a computer usable storage medium to store a computer readable program that, when executed on a computer, causes the computer to perform operations, as described herein.

Furthermore, embodiments of at least portions of the invention can take the form of a computer program product accessible from a computer-usable or non-transitory computer-readable medium providing computer executable instructions, or program code, for use by or in connection with a computer or any instruction execution system. For the purposes of this description, a non-transitory computer-usable or computer readable medium can be any apparatus that can contain or store the program for use by or in connection with the instruction execution system, apparatus, or device.

The computer-usable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In an embodiment, the above-described functionality is performed by a computer or computers, such as a network device that sits between a fabric switch and a LAN. FIG. 13 depicts a computer 500 that includes a processor 502, memory 504, and a communications interface 506. The processor may include one or more multifunction processors and/or application-specific processors. Examples of processors include the PowerPC™ family of processors by IBM and the x86 family of processors by Intel such as the Xeon™ family of processors and the Intel X5650 processor. The memory within the computer may include, for example, storage medium such as read only memory (ROM), flash memory, RAM, and a large capacity permanent storage device such as a hard disk drive and any combination thereof. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A network device comprising:
   a local area network (LAN) switching fabric physical interface configured to communicate according to a LAN switching fabric protocol, wherein the LAN switching fabric physical interface is configured to communicate according to one of INFINIBAND, Fibre channel, IEEE 802.3x pause fames, Data Center Bridging (DCB), IEEE 802.1Qbb (Priority-based Flow Control), IEEE 802.1 Qaz (Enhanced Transmission Selection), IEEE 802.1Qau (Congestion Notification), OpenFabrics RDMA over Converged Ethernet (RoCE), and Omni-Path;
   a wide area network (WAN) physical interface configured to communicate according to a WAN protocol, wherein the WAN physical interface is configured to interface with one of SONET, SDH, OTN, dark fiber, Ethernet, and satellite;
   a fabric extension function configured to;
      map LAN switching fabric interfaces to Layer 2 pseudo-ports, wherein the Layer 2 pseudo-ports are identified by Layer 2 pseudo-port identifiers;
      map Layer 2 pseudo-ports to WAN interfaces; and
      transmit LAN fabric datagrams, which are received at the LAN switching fabric physical interface, out from the WAN physical interface via a mapped Layer 2 pseudo-port and a corresponding WAN interface;
      wherein the fabric extension function is further configured to 1) transmit and receive Layer 2 pseudo-port link state packets via the WAN physical interface to establish a link across a WAN, wherein the Layer 2 pseudo-port link state packets include a Layer 2 field for carrying a Layer 2 pseudo-port identifier, a Layer 2 link state operations code field for carrying information to establish a link between the network device and a second network device across the WAN, and a Layer 2 link state field for carrying information about a link state, and 2) transmit and receive Layer 2 pseudo-port flow control packets via the WAN physical interface to implement flow control across the WAN, wherein the Layer 2 pseudo-port packets include a Flow Control Transmit Blocks Sent (FCTBS) field that carries a running count of blocks sent and a Flow Control Credit Limit (FCCL) field that carries rolling count of credits.

2. The network device of claim 1 wherein the fabric extension function is further configured to transmit and receive Layer 2 pseudo-port flow control packets via the WAN physical interface to implement credit-based flow control across a WAN.

3. The network device of claim 1 wherein the fabric extension function is further configured to transmit and receive Layer 2 pseudo-port flow control packets via the WAN physical interface to implement credit-based flow control across the WAN, and wherein the fabric extension function is further configured to transmit and receive LAN fabric datagrams over the established link via the WAN physical interface according the credit-based flow control.

4. The network device of claim 1 wherein the fabric extension function is further configured to transmit and receive Layer 2 pseudo-port flow control packets via the WAN physical interface to implement XON/XOFF flow control across the WAN, and wherein the fabric extension function is further configured to transmit and receive LAN fabric datagrams over the established link via the WAN physical interface according the XON/XOFF flow control.

5. The network device of claim 1 wherein the fabric extension function is further configured to measure delay through a WAN and to use the measured delay to adjust buffer depths to maintain buffer extension and lossless characteristics of the Layer 2 pseudo-ports.

6. The network device of claim 1 wherein a Layer 2 pseudo-port is associated with a logical WAN connection that allows a port of the LAN switching fabric to be extended across a WAN.

7. The network device of claim 1, wherein the Layer 2 pseudo-port link state packets and the Layer 2 pseudo-port flow control packets have formats that correspond to INFINIBAND frame format of the Local Routing Header.

8. The network device of claim 1, wherein the Layer 2 pseudo-port link state packets and the Layer 2 pseudo-port flow control packets use the same Local Routing Header (LRH) header format as in INFINIBAND.

9. A method for accessing remote digital data over a wide area network (WAN), the method comprising:
receiving LAN fabric datagrams at a LAN switching fabric physical interface of a first network device, wherein the LAN switching fabric physical interface is configured to communicate according to one of INFINIBAND, Fibre channel, IEEE 802.3x pause fames, Data Center Bridging (DCB), IEEE 802.1Qbb (Priority-based Flow Control), IEEE 802.1 Qaz (Enhanced Transmission Selection), IEEE 802.1Qau (Congestion Notification), OpenFabrics RDMA over Converged Ethernet (RoCE), and Omni-Path;
mapping the LAN switching fabric interface of the received LAN fabric datagrams to a Layer 2 pseudo-port, wherein the Layer 2 pseudo-port is identified by Layer 2 pseudo-port identifier;
transmitting the LAN fabric datagrams out from a WAN physical interface of the first network device using the mapped Layer 2 pseudo-port and credit-based flow control, wherein the WAN physical interface is configured to interface with one of SONET, SDH, OTN, dark fiber, Ethernet, and satellite;
transmitting Layer 2 pseudo-port link state packets out from the WAN physical interface to establish a link across the WAN, wherein the Layer 2 pseudo-port link state packets include a Layer 2 field for carrying a Layer 2 pseudo-port identifier, a Layer 2 link state operations code field for carrying information to establish a link between the first network device and a second network device across the WAN, and a Layer 2 link state field for carrying information about a link state; and
transmitting Layer 2 pseudo-port flow control packets out from the WAN physical interface to implement the credit-based flow control across the WAN, wherein the Layer 2 pseudo-port packets include a Flow Control Transmit Blocks Sent (FCTBS) field that carries a running count of blocks sent and a Flow Control Credit Limit (FCCL) field that carries rolling count of credits.

10. The method of claim 9, wherein the LAN fabric datagrams are transmitted from the WAN physical interface of the first network device using a logical WAN interface carried within the WAN physical interface.

11. The method of claim 9, further comprising:
receiving the LAN fabric datagrams at a WAN physical interface of a second network device;
mapping the Layer 2 pseudo-port of the received LAN fabric datagrams to a LAN switching fabric interface of the second network device; and
transmitting the LAN fabric datagrams out from a LAN switching fabric physical interface of the second network device via the mapped LAN switching fabric interface.

12. The method of claim 9, wherein the Layer 2 pseudo-port link state packets and the Layer 2 pseudo-port flow control packets have formats that correspond to INFINIBAND frame format of the Local Routing Header.

13. The method of claim 9, wherein the Layer 2 pseudo-port link state packets and the Layer 2 pseudo-port flow control packets use the same Local Routing Header (LRH) header format as in INFINIBAND.

14. A method for accessing remote digital data over a wide area network (WAN), the method comprising:
at a first network device that includes a local area network (LAN) switching fabric physical interface configured to communicate according to a LAN switching fabric protocol and a WAN physical interface configured to communicate according to a WAN protocol, wherein the LAN switching fabric physical interface is configured to communicate according to one of INFINIBAND, Fibre channel, IEEE 802.3x pause fames, Data Center Bridging (DCB), IEEE 802.1Qbb (Priority-based Flow Control), IEEE 802.1 Qaz (Enhanced Transmission Selection), IEEE 802.1Qau (Congestion Notification), OpenFabrics RDMA over Converged Ethernet (RoCE), and Omni-Path, and wherein the WAN physical interface is configured to interface with one of SONET, SDH, OTN, dark fiber, Ethernet, and satellite;
exchanging Layer 2 pseudo-port link state packets with a WAN physical interface of a second network device across the WAN to couple a LAN switching fabric across the WAN, the Layer 2 pseudo-port packets comprising;
a Layer 2 field for carrying a Layer 2 pseudo-port identifier;
a Layer 2 link state operations code field for carrying information to establish a link between the first network device and the second network device across the WAN;
a Layer 2 link state field for carrying information about a link state;
exchanging Layer 2 pseudo-port flow control packets across the WAN with the WAN physical interface of the second network device via the WAN physical interface of the first network device to implement flow control of LAN fabric datagrams that are transmitted across the WAN, wherein the Layer 2 pseudo-port flow control packets include a Flow Control Transmit Blocks Sent (FCTBS) field that carries a running count of blocks sent and a Flow Control Credit Limit (FCCL) field that carries rolling count of credits.

15. The method of claim 14, wherein the Layer 2 pseudo-port link state packets and the Layer 2 pseudo-port flow control packets have formats that correspond to INFINIBAND frame format of the Local Routing Header.

16. The method of claim 14, wherein the Layer 2 pseudo-port link state packets and the Layer 2 pseudo-port flow control packets use the same Local Routing Header (LRH) header format as in INFINIBAND.

* * * * *